United States Patent
Ballantine et al.

(10) Patent No.: US 11,128,147 B2
(45) Date of Patent: Sep. 21, 2021

(54) POWER SYSTEM INTEGRATED WITH DUAL POWER ELECTRICAL LOAD

(71) Applicant: BLOOM ENERGY CORPORATION, Sunnyvale, CA (US)

(72) Inventors: Arne Ballantine, Palo Alto, CA (US); Ranganathan Gurunathan, Bangalore (IN); Rajesh Gopinath, Sunnyvale, CA (US); Carl Cottuli, Franklin, MA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 449 days.

(21) Appl. No.: 15/945,194

(22) Filed: Apr. 4, 2018

(65) Prior Publication Data
US 2019/0312441 A1 Oct. 10, 2019

(51) Int. Cl.
| | |
|---|---|
| *H02J 4/00* | (2006.01) |
| *H02J 3/38* | (2006.01) |
| *H01M 8/02* | (2016.01) |
| *G06F 1/26* | (2006.01) |

(52) U.S. Cl.
CPC ............ *H02J 4/00* (2013.01); *G06F 1/263* (2013.01); *H01M 8/02* (2013.01); *H02J 3/387* (2013.01); *H01M 2250/10* (2013.01)

(58) Field of Classification Search
CPC .......... H02J 4/00; H02J 3/387; H02J 2310/16; G06F 1/263; H01M 8/02; H01M 2250/00; Y02E 60/50; H05K 7/1492
USPC ......................................................... 307/26
See application file for complete search history.

(56) References Cited

U.S. PATENT DOCUMENTS

| | | | |
|---|---|---|---|
| 7,705,490 B2 | 4/2010 | Srinivasan et al. | |
| 7,713,649 B2 | 5/2010 | Hickey et al. | |
| 7,974,106 B2 | 7/2011 | Gurunathan et al. | |
| 8,232,676 B2 | 7/2012 | Gurunathan et al. | |
| 8,263,276 B1 | 9/2012 | Gurunathan et al. | |
| 8,288,891 B2 | 11/2012 | Ballantine et al. | |
| 8,535,836 B2 | 9/2013 | Ballantine et al. | |
| 8,624,549 B2 | 1/2014 | Sridhar et al. | |
| 8,872,392 B1 | 10/2014 | Gurunathan et al. | |
| 8,970,176 B2 | 3/2015 | Ballantine et al. | |
| 9,106,098 B2 | 8/2015 | Srinivasan et al. | |
| 9,214,812 B2 | 12/2015 | Ballantine et al. | |
| 9,362,815 B2 | 6/2016 | Gurunathan et al. | |

(Continued)

*Primary Examiner* — Daniel Cavallari
*Assistant Examiner* — Swarna N Chowdhuri
(74) *Attorney, Agent, or Firm* — The Marbury Law Group PLLC

(57) ABSTRACT

A system and method of provided power to one or more electrical loads of an electrical load module is provided. The electrical load module includes an alternating current (AC) power input port, a direct current (DC) power input port, a power distribution device, a first power supply device, a second power supply device, and a first electrical load component. The power distribution device is electrically coupled to the AC power input port via a first connector and the DC power input port via a second connection. The first electrical load component is coupled to the first power supply device and the second power supply device. The first power supply device and the second power supply device are configured to provide power to the first electrical load component and a feed from an alternative power source system is directly connected to the DC power input port of the electrical load module.

4 Claims, 11 Drawing Sheets

(56) References Cited

U.S. PATENT DOCUMENTS

| | | | |
|---|---|---|---|
| 9,639,130 B2 | 5/2017 | Gurunathan et al. | |
| 9,929,567 B2* | 3/2018 | Wang | H02J 4/00 |
| 2008/0280175 A1 | 11/2008 | Gurunathan et al. | |
| 2010/0013317 A1 | 1/2010 | Ballantine et al. | |
| 2012/0098336 A1 | 4/2012 | Gurunathan et al. | |
| 2012/0146587 A1 | 6/2012 | Srinivasan et al. | |
| 2012/0326504 A1 | 12/2012 | Ballantine et al. | |
| 2012/0326516 A1* | 12/2012 | Gurunathan | H02J 1/00 307/72 |
| 2014/0009003 A1* | 1/2014 | Ballantine | H02J 1/102 307/154 |
| 2015/0177808 A1* | 6/2015 | Sarti | G06F 1/30 713/300 |
| 2015/0288220 A1 | 11/2015 | Gurunathan et al. | |
| 2017/0005480 A1 | 1/2017 | Ballantine et al. | |
| 2017/0170683 A1* | 6/2017 | Navarro | H02M 7/44 |
| 2017/0338502 A1 | 11/2017 | Pmsvvsv et al. | |
| 2018/0116070 A1* | 4/2018 | Broadbent | H02J 4/00 |

\* cited by examiner

POWER SYSTEM INTEGRATED WITH DUAL POWER ELECTRICAL LOAD

The present disclosure is directed to integrating an energy power system with an electrical load, such as integrating an alternative power source system with a dual power electrical load.

BACKGROUND

Electrical power systems can be used to provide electrical power to one or more electrical loads such as buildings, appliances, lights, tools, air conditioners, heating units, factory equipment and machinery, power storage units, computers, security systems, etc. The electricity used to power an electrical load is often generated at a power station using fossil fuels, nuclear energy, hydro-electricity, etc. However, electricity may alternatively or additionally be generated using alternative power sources such as fuel cells, solar arrays, wind turbines, thermo-electric devices, batteries, etc.

Regardless of the generation method, electricity is still generally distributed using an electrical grid infrastructure where the output of the electrical grid infrastructure is an alternating current (AC) output. However, the power generated by alternative power sources is generally a direct current (DC). Therefore, in order to distribute electricity generated by alternative power sources, the DC power generated by the alternative power source must first be converted into AC before being tied into a utility line of the electrical grid infrastructure.

Power conversion between DC and AC requires additional components which undesirably increase the complexity of the electrical power system and reduces the efficiency of the system. In addition, different components of an electrical load may use different types of power. For example, an electrical load may include components that utilize an AC power source (e.g., electro-mechanical devices such as 3-phase AC motors, pumps, blowers, etc.) or components that utilize a DC power source (e.g., electronic devices such as computers, servers, etc.). Therefore, in addition to the power conversion components introduced in the distribution of electricity, the electrical load may also include additional components to perform AC to DC conversion for the components that utilize DC power.

SUMMARY

The present disclosure may solve one or more of the above-mentioned problems and/or achieve one or more of the above-mentioned desirable features. Other features and/or advantages may become apparent from the description which follows.

An aspect of the present disclosure provides for an electrical load module. The electrical load module includes an alternating current (AC) power input port, a direct current (DC) power input port, a power distribution device, a first power supply device, a second power supply device, and a first electrical load component. The power distribution device is electrically coupled to the AC power input port via a first connector and the DC power input port via a second connection. In addition, the power distribution device includes an AC power output and a DC power output. The first power supply device is electrically coupled to the AC power output of the power distribution device. The second power supply device is electrically coupled to the DC power output of the power distribution device. The first electrical load component is electrically coupled to the first power supply device and the second power supply device. The first power supply device and the second power supply device are configured to provide power to the first electrical load component and a feed from an alternative power source system is directly connected to the DC power input port of the electrical load module.

Another aspect of the present disclosure provides for a method of providing power to one or more electrical loads of an electrical load module. The method includes receiving, at the electrical load module, an alternating current (AC) power input and a direct current (DC) power input; transmitting a first portion of the AC power input to a first power supply of the electrical load module and a first portion of the DC power input to a second power supply of the electrical load module; and providing, by the first power supply and the second power supply, power to a first electrical load component.

Another aspect of the present disclosure provides for an electrical power system. The electrical power system includes an alternative power source system and an information technology (IT) pod electrically connected to the alternative power source system via a first AC bus and a second DC bus. The alternative power source system including a fuel cell system having a plurality of fuel cell segments, a direct current (DC)/alternating current (AC) inverter electrically connected to the fuel cell system via a first DC bus and a DC/DC converter electrically connected to the fuel cell system via the first DC bus. The DC/AC inverter receives DC power from the fuel cell system and converts the DC power to AC power. The DC/DC converter receives DC power from the fuel cell system and converts the DC power of the first voltage to DC power of a second voltage. The IT pod includes a server, a first power supply electrically connected to the server, a second power supply electrically connected to the server, and a power distribution unit electrically connected to the first AC bus and the second DC bus. The power distribution unit provides the first power supply with AC power and provides the second power supply with DC power where the first power supply provides the server with AC power and the second power supply provides the server with DC power.

BRIEF DESCRIPTION OF THE DRAWINGS

The accompanying drawings, which are incorporated herein and constitute a part of this specification, illustrate exemplary embodiments. Together with the general description given above and the detailed description given below, serve to explain the features of the various embodiments.

DETAILED DESCRIPTION

Figure 1:
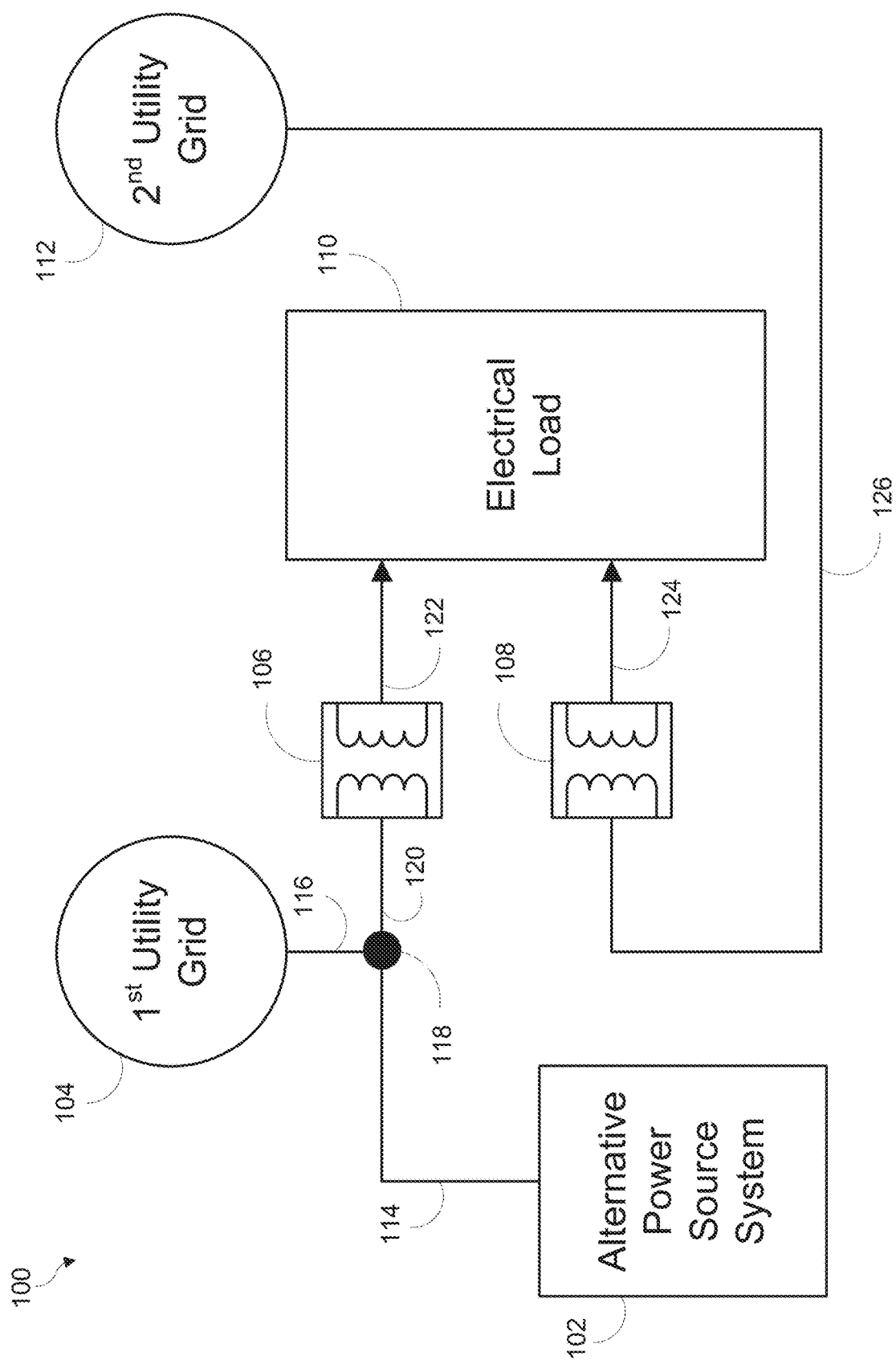
FIG. 1 is a block diagram illustrating an energy power supply system connected to an electrical load module according to an embodiment of the present disclosure.

The various embodiments will be described in detail with reference to the accompanying drawings. Whenever possible, the same reference numbers will be used throughout the drawings to refer to the same or like parts. References made to particular examples, details, and representative materials, methods, and implementations are for illustrative purposes, and are not intended to limit the scope of the various embodiments of the claims.

The following description with reference to the accompanying figures is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "can have," "include", "may include", "can include", "comprise", and the like used herein indicate the existence of a corresponding feature (e.g., a number, a function, an operation, or an element) and do not exclude the existence of an additional feature.

The terms "A or B", "at least one of A and/or B", or "one or more of A and/or B" may include all possible combinations of items listed together. For example, the terms "A or B", "at least one of A and B", or "at least one of A or B" may indicate all the cases of (1) including at least one A, (2) including at least one B, and (3) including at least one A and at least one B.

The terms "first", "second", and the like used herein may modify various elements regardless of the order and/or priority thereof, and are used only for distinguishing one element from another element, without limiting the elements. For example, "a first element" and "a second element" may indicate different elements regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" as used herein may be interchangeably used with the terms, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation or a general-purpose processor (e.g., a central processing unit (CPU) or an application processor) for executing at least one software program stored in a memory device to perform a corresponding operation.

The terminology herein is only used for describing specific embodiments and is not intended to limit the scope of other embodiments. The terms of a singular form may include plural forms unless otherwise specified. The terms used herein, including technical or scientific terms, have the same meanings as understood by those of ordinary skill in the art. Terms defined in general dictionaries, among the terms used herein, may be interpreted as having meanings that are the same as, or similar to, contextual meanings defined in the related art, and should not be interpreted in an idealized or overly formal sense unless otherwise defined explicitly. Depending on the case, even the terms defined herein should not be such interpreted as to exclude various embodiments of the present disclosure.

The word "exemplary" is used herein to mean "serving as an example, instance, or illustration." Any implementation described herein as "exemplary" is not necessarily to be construed as preferred or advantageous over other implementations.

Electrical power requirements and consumption may vary based on the type of application in which an electrical load is deployed. Different applications may have different levels of electrical power requirements as well as varying reliability and availability needs. For example, electrical loads associated with facilities, companies, and/or industries such as factories, hospitals, or information technology (IT) companies may consume more power and have a greater need for access to reliable, uninterrupted electricity distribution while an electrical load deployed for residential purposes may consume less power and have a greater tolerance for interrupted service.

It is desirable to reduce resources attributable to electrical power distribution and/or consumption. For example, electrical power consumption may be reduced by directly supplying generated power to an electrical load from an alternative power source system rather than connecting through an electrical utility grid. Accordingly, undesirable conversion losses introduced by components of the power distribution network (e.g., AC transformers, rectifiers, etc.) may reduce electrical power consumption. In addition, for IT applications, overall electrical power consumption may be reduced by providing more efficient cooling to IT equipment. The embodiments described herein include means to reduce power consumption by providing more efficient delivery and/or utilization of electrical power.

FIG. 1 is a block diagram illustrating an energy power supply system connected to an electrical load module according to an embodiment of the present disclosure.

In solutions for reducing energy consumption, electricity costs have been reduced by generating a portion of the power provided to an electrical load using an alternative power source system. For example, reduced electricity costs can be achieved by providing a reliable source of power to an electrical load over a utility grid by combining power generated using an alternative power source system with power generated using fossil fuels such as natural gas or coal, nuclear energy, or hydro-electricity.

Referring to FIG. 1, an electrical power system 100 includes an alternative power source system 102, a first utility grid node 104, a first transformer 106, a second transformer 108, an electrical load module 110, and a second utility grid node 112.

The alternative power source system 102 is configured to generate DC power using one or more alternative power generation components. In an exemplary embodiment, the alternative power generation components include fuel cells, solar arrays, wind turbines, thermo-electric devices, batteries, other DC power sources, or a combination thereof.

The alternative power source system 102 can be disposed within a single enclosure (e.g., housing or cabinet for a fuel cell system power module), within a geographical area, or different components of the alternative power source system 102 can be distributed at different geographic locations where the different components are connected via a network or grid.

The alternative power source system 102 can further include one or more power conditioning components. The power conditioning components can include one or more components configured to modify one or more properties of the power generated by the alternative power generation components (e.g., converting DC power to AC power, converting generated power to different voltages and/or frequencies, or a combination thereof), electrical connectors including connectors for connecting each power conditioning component within the power generation component as well as connectors for connecting the alternative power source system 102 with a utility grid distribution network, circuits for managing electrical transients, a controller or processor (e.g., a computer or dedicated control logic device or circuit), etc.

In an exemplary embodiment, the power conditioning components configured to modify one or more properties of the power generated by the alternative power generation components can include one or more transformers, rectifiers, DC/AC inverters, DC/DC converters, etc. One or more the power conditioning components can be included in one or more components of the alternative power source system 102. For example, the alternative power source system 102 can include one or more of an input/output module (IOM), an uninterruptable power supply module (UPM), etc.

An IOM can include one or more of a DC/AC inverter, electrical connectors, circuits for managing electrical transients, a controller or processor for controlling the IOM and/or the alternative power source system 102, etc. In an exemplary embodiment, an IOM may be a grid-tie inverter.

The alternative power generation components and/or power conditioning components of the alternative power source system 102 may be controlled by a system monitor. For example, the amount of DC power generated and/or distributed to an electrical load may be based on various factors including power demand required by the electrical load, power availability from a power generation utility, etc. The system monitor can be a monitoring and/or control device configured to monitor and/or control the power generation, power conditioning, and/or power distribution components of the alternative power source system 102. The system monitor can be implemented as hardware, software, or any combination thereof. For example, the system monitor can include a processor and a tangible computer-readable medium such as a memory, magnetic storage device, optical disk, smart card, flash memory device, etc. The tangible computer-readable medium can be configured to store computer-executable instructions that, when executed, cause the system monitor to perform any of the operations described herein. The system monitor can also include a user input device for receiving commands and/or programming instructions, and/or an output such as a display.

The first utility grid node 104 and the second utility grid node 112 are junction points within a power distribution network. For example, power generated by a power station may be transmitted by a public utility over the electrical grid of the power distribution network. The power generated by the power station may be supplied or distributed to the electrical load module 110 via the first utility grid node 104 and/or the second utility grid node 112. In an exemplary embodiment, power transmitted via the first utility grid node 104 and power transmitted via the second utility grid node 112 may be generated by the same power station, different power stations, or a combination thereof.

The electrical load module 110 is configured to consume electrical power. The electrical load module 110 includes one or more electrical components. The electrical load module 110 can be any individual electrical component such as an appliance, a light, a tool, an air conditioner, a heating unit, a piece of factory equipment and/or machinery, a power storage unit, a computer, a security system, etc. Alternatively, the electrical load module 110 may be plurality of electrical components including a combination thereof. For example, the electrical load module may be a building, a facility, etc. that includes a plurality of electrical components. The electrical load module 110 includes one or more electrical components that consume AC power and/or DC power.

In operation, AC power is indirectly transmitted to the electrical load module 110 from the alternative power source system 102. Specifically, the alternative power source system 102 generates DC power where power conditioning components of the alternative power source system 102 convert the generated DC power into AC power. In an exemplary embodiment, during the conversion from DC power to AC power, the AC power signal transmitted from the alternative power source system 102 is generated to have properties (e.g., voltage level, frequency, etc.) that match the properties of the AC power transmitted from the first utility grid node 104 to allow for ease of combinability at the junction 118. For example, the power signal transmitted over transmission line 114 from the alternative power source system 102 is 480 VAC and the power signal transmitted over transmission line 116 from the first utility grid node 104 is also 480 VAC.

The power signal transmitted from the alternative power source system 102 and/or the power signal transmitted from the first utility grid node 104 migrates from the junction point 118 to the electrical load module 110. Specifically, a power signal having the same properties as those transmitted from the alternative power source system 102 and/or the first utility grid node 104 is transmitted over transmission line 120 to the first transformer 106. The first transformer 106 transforms the power signal to a second voltage level (e.g., 400-415 VAC) where a power signal at the second voltage level is transmitted over transmission line 122 to a first input port of the electrical load module 110. Simultaneously and/or concurrently, a power signal is transmitted from the second utility grid node 112 to the second transformer 108 via transmission line 126 where the second transformer 108 transforms the power signal to a second voltage level (e.g., 400-415 VAC). A power signal at the second voltage level is transmitted over transmission line 124 to a second input port of the electrical load module 110.

The electrical load module 110 distributes the power received at the first input port and/or the second input port to power supplies associated with electrical load components. Any electrical load components that utilize AC power can utilize the power received at the first input port and/or the second input port of the electrical load module 110. For any electrical load components that utilize DC power, the AC power received at the first input port and/or the second input port of the electrical load module 110 is first inverted (e.g., using a rectifier) to DC power before the DC power is provided to the electrical load components that utilize DC power.

Figure 2:
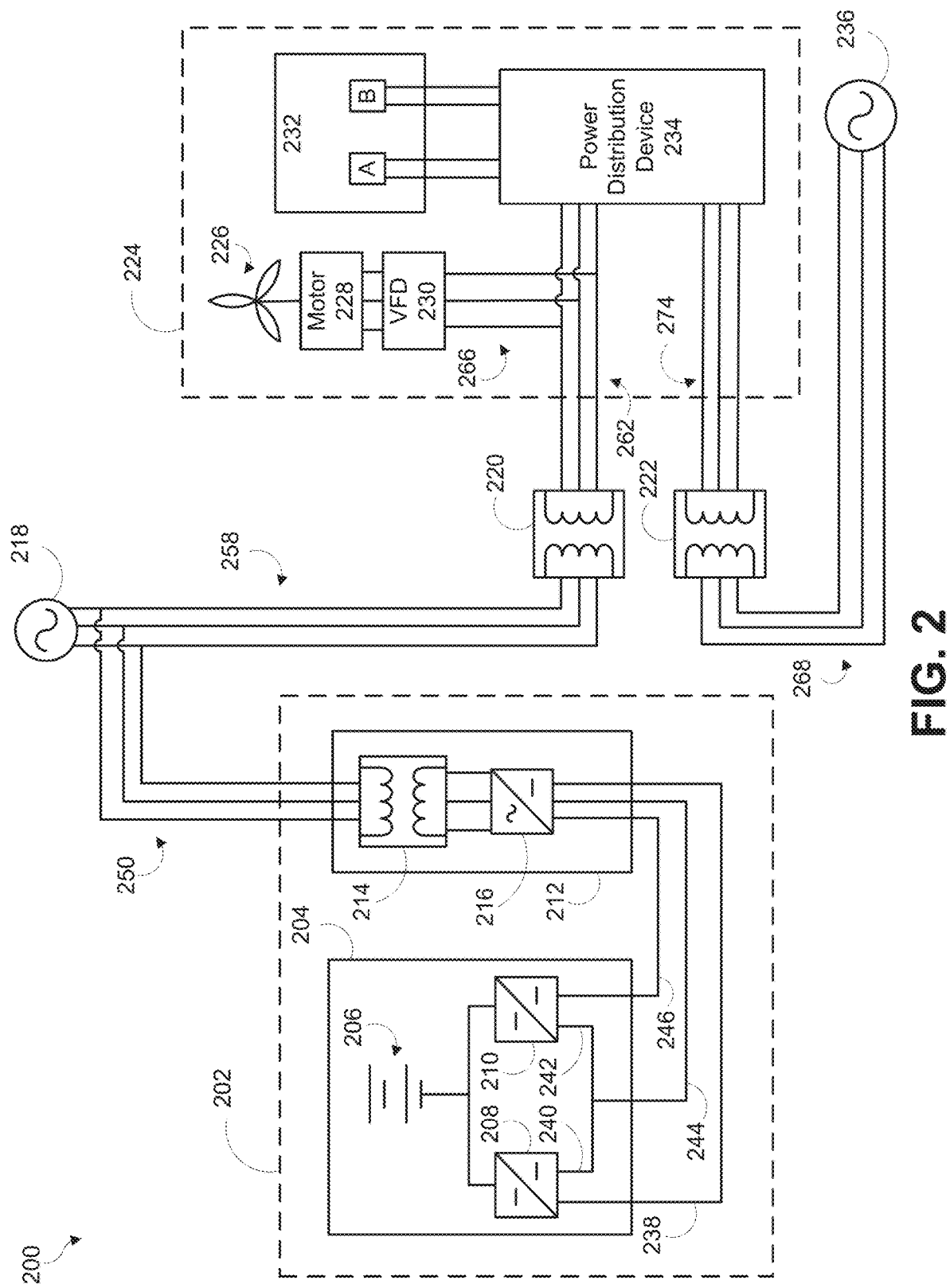
FIG. 2 is a schematic illustration of an energy power supply system connected to an electrical load module according to another embodiment of the present disclosure.

FIG. 2 is a schematic illustration of an energy power supply system connected to an electrical load module according to another embodiment of the present disclosure.

Referring to FIG. 2, an electrical power system 200 includes an alternative power source system 202 (which corresponds to 102), a first utility grid node 218 (e.g., grid node 104), a first transformer 220 (e.g., transformer 106), a second transformer 222 (e.g., transformer 108), an electrical load module 224 (e.g., electrical load module 110), and a second utility grid node 236 (e.g., grid node 112).

The alternative power source system 202 includes one or more power generation components 204 and one or more power conditioning components 212. While omitted for clarity, the alternative power source system 202 may further include a system monitor to monitor and/or control power generation, conditioning, and/or distribution performed by the alternative power source system 202.

The power generation component 204 includes any number of power generation modules (such as power generation module 206) and any number of power conditioning components. The power conditioning components may include components for converting DC power of a first voltage to DC power of a second voltage (such as first power conditioning element 208 and second power conditioning element 210), electrical connectors including connectors to connect a DC power output to a DC microgrid, circuits for managing electrical transients, a system controller, etc.

The power generation module 206 is any device that generates DC power such as a fuel cell power generation module, a solar cell, a wind turbine, geothermal or hydroelectric power generators, or combinations thereof. The power generation module 206 is coupled to one or more electrical connectors or leads to output the power generated by the power generation module 206.

For clarity purposes only one power generation module 206 is illustrated in FIG. 2. However, the power generation component 204 can include any number of power generation modules 206 and/or power conditioning components. In an exemplary embodiment, the power generation component 204 can include an array of two to six power generation modules 206, such as four power generation modules, where each power generation module 206 is coupled to two or more power conditioning components as illustrated in FIG. 2. Further, alternative power source system 202 may also include any number of power generation components 204 combined in series or in parallel. For example, the alternative power source system 202 can include six power generation components 204.

In an exemplary embodiment, the alternative power source system 202 can include the power generation module 206 having one or more fuel cell power generators. A fuel cell power generator may include one or more stacks or columns of fuel cells which can be electrically connected into fuel cell segments. The fuel cells may be a solid oxide fuel cell having a ceramic oxide electrolyte separated by conductive interconnect plates. However, other types of fuel cells, such as polymer electrolyte membrane (PEM), molten carbonate, phosphoric acid, etc. may also be used. Each fuel cell stack includes fuel cells electrically connected in series and separated by electrically conductive interconnects, such as gas separator plates which function as interconnects. A fuel cell stack can include conductive end plates on either end of the stack.

The output of the power generation module 206 may be electrically coupled to power conditioning elements such as the first power conditioning element 208 and the second power conditioning element 210. In an exemplary embodiment, the first power conditioning element 208 and/or the second power conditioning element 210 are configured to convert the voltage of the DC power generated by the power generation module 206 from a first voltage level to a second voltage level. For example, the first power conditioning element 208 and/or the second power conditioning element 210 may be DC/DC converters configured to increase (e.g., boost) the voltage of the DC power generated by the power generation module 206 or decrease (e.g., buck) the voltage of the DC power generated by the power generation module 206.

While the first power conditioning element 208 and the second power conditioning element 210 are illustrated as being disposed within the power generation component 204 in FIG. 2, the first power conditioning element 208 and/or the second power conditioning element 210 may be stand-alone elements, incorporated within another element (e.g., IOM) of the alternative power source system 202, or omitted.

In an exemplary embodiment, the alternative power source system 202 may further include an energy storage module including an energy storing device such as a bank of supercapacitors, batteries, flywheel, etc. The energy storage module may be electrically connected to the power generation module 206 and/or the first power conditioning element 208 and/or the second power conditioning element 210.

The power generation module 206 and elements 208, 210 may be electrically coupled to the power conditioning component 212 via transmission links or buses 238, 244, 246. In an exemplary embodiment, the first power conditioning element 208 and the second power conditioning element 210 may each include a positive output and a negative output. The positive output of the first power conditioning element 208 is transmitted to the power conditioning component 212 via the transmission link 238. The negative output of the second power conditioning element 210 is transmitted to the power conditioning component 212 via the transmission link 246. The negative output of the first power conditioning element 208 is transmitted via transmission link 240 and the positive output of the second power conditioning element 210 is transmitted via transmission link 242 where the negative output and the positive output are combined to create a neutral output transmitted to the power conditioning component 212 via transmission link 244.

The power conditioning component 212 is configured to modify or condition one or more properties of the power generated by the power generation module 206. The power conditioning component 212 includes one or more power conditioning elements. The power conditioning elements may include components for converting DC power to different AC voltages and/or frequencies, electrical connectors including connectors to a DC microgrid and connectors to the AC grid associated with the first utility grid node 218, circuits for managing electrical transients, a system controller (e.g., a computer or dedicated controller device or circuit), etc. While only one power conditioning component 212 is illustrated in FIG. 2, electrical power system 200 may include any number of power conditioning components including any number of power conditioning elements. In addition, when the electrical power system 200 includes a plurality of power conditioning components, each power conditioning component may be the same or different.

In an exemplary embodiment, the power conditioning component 212 includes a first power conditioning element 214 and a second power conditioning element 216. The power conditioning component 212 may be an IOM where the first power conditioning element 214 may be one or more transformers and the second power conditioning element 216 may be an inverter configured to convert the received DC power into AC power. For example, the second power conditioning element 216 may be a DC/AC inverter such as DC/AC inverter described in U.S. Pat. No. 7,705,490, incorporated herein by reference in its entirety.

The first power conditioning element 214 may be configured to modify the voltage level or the frequency of the AC power output from the second power conditioning element 216 where the second power conditioning element 216 is configured to convert DC power to AC power. For example, the first power conditioning element 214 and the second power conditioning element 216 of the power conditioning component 212 may modify the properties of the power generated by the power generation module 206 to generate a 208V, 60 Hz, 480V, 60 Hz, 415V, and/or 50 Hz AC as well as an AC having other common voltages and/or frequencies.

The power generated by the alternative power source system 202 migrates via transmission link(s) 250 and connects at a junction (e.g., node 118) with power transmitted from a first utility grid node 218. The combined power transmitted from the alternative power source system 202 and the first utility grid node 218 migrates to the transformer 220 via transmission link(s) 258 where the output of the transformer 220 is provided to a first input port of the electrical load module 224. In addition, the power transmitted from the second power source system (e.g., second utility grid node 236) migrates to the second transformer 222 via transmission link(s) 268 where the output of the transformer 222 is provided to a second input port of the electrical load module 224.

In an exemplary embodiment, the power transmitted from the alternative power source system 202, the first utility grid node 218, and the second utility grid node 236 is 480VAC where transformers 220 and 222 transform the power into 400-415VAC, before the two power feeds are provided to the electrical load module 224.

The electrical load module 224 may include various elements such as a fan 226, a motor 228, a variable frequency drive (VFD) 230, power supply A, power supply B, an electrical load component 232, and a power distribution device 234. While the electrical load module 224 is illustrated in FIG. 2 to include a plurality of electrical load components (e.g., motor 228, VFD 230, electrical load component 232), the electrical load module 224 may include one or more components that consume electrical power.

The power distribution device 234 is configured to receive a plurality of AC power feeds. Specifically, the power distribution device 234 receives the AC power transmitted from the alternative power source system 202 and/or the first utility grid node 218 via a first connector(s) 262 and the AC power transmitted from the second utility grid node 236 via a second connector(s) 274. The power distribution device 234 may be configured to provide a designated one of the received electrical feeds to a designated one of power supply A and power supply B. Alternatively, the power distribution device 234 may provide a portion of the power received on the first port and a portion of the power received on the second port to power supply A and/or power supply B.

At least one electrical load component 232 of the electrical load module 224 is electrically coupled to a plurality of power supplies. For example, an electrical load component 232 is electrically coupled to power supply A and power supply B. The inputs of the power supplies A and B may be connected to the power distribution device 234 to receive the electrical power for powering the electrical load component 232 such as a dual corded IT load (e.g., server or racks of servers). In addition, power supply A and power supply B may be connected to the power distribution device 234 via separate electrical connections or busses.

When the electrical load module 224 includes the fan 226, motor 228, and/or the VFD 230, the VFD 230 may be configured to provide and control power to the fan motor 228 such that the fan motor 228 actuates the fan 226. Specifically, the VFD 230 is electrically coupled to the first connector(s) 262 via a third connector(s) 266.

Each electrical load component may consume or utilize AC power or DC power. For example, the motor 228 may rely on AC power in order to power the fan 226 and the electrical load component 232 may rely on DC power. The power distribution device 234 may be further configured to convert the AC power received from the alternative power source system 202, the first utility grid node 218, and/or the second utility grid node 224 into DC power before distributing the DC power to power supply A and/or power supply B for the IT load 232 which operates on DC power.

Figure 3:
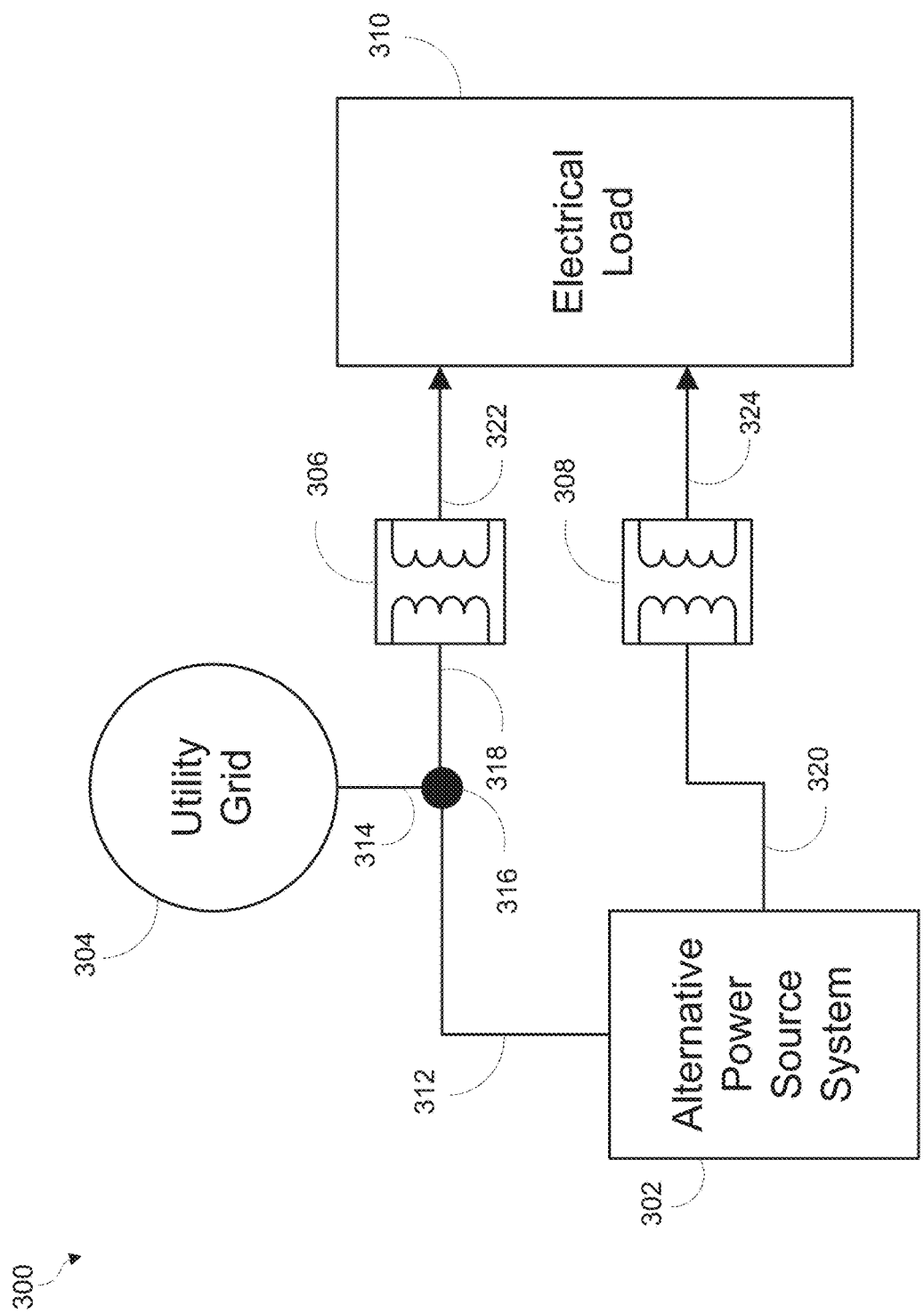
FIG. 3 is a block diagram illustrating an energy power supply system connected to an electrical load module according to another embodiment of the present disclosure.

FIG. 3 is a block diagram illustrating an energy power supply system connected to an electrical load module according to another embodiment of the present disclosure.

Referring to FIG. 3, an electrical power system 300 includes an alternative power source system 302, a utility grid node 304, a first transformer 306, a second transformer 308, and an electrical load module 310.

In contrast to FIG. 1, FIG. 3 illustrates an embodiment such that the feed from the second utility grid node 112 is replaced with a second integration (i.e., feed) between the alternative power source system 302 and the electrical load module 310.

Specifically, the alternative power source system 302 of the electrical power system 300 generates two AC power feeds that are integrated with the electrical load module 310. The first AC power feed is transmitted from the alternative power source system 302 via transmission link 312 to the junction 316 where the first AC power feed is combined with the AC power transmitted from the utility grid node 304 via transmission link 314. The combined AC power is then transmitted via transmission link 318 to the first transformer 306 where the transformed combined AC power is provided to the electrical load module 310 via transmission link 322. The second AC power feed is transmitted from the alternative power source system 302 via transmission link 320 to the second transformer 308 where the transformed AC power from the second feed is provided to the electrical load module 310 via transmission link 324.

Figure 4:
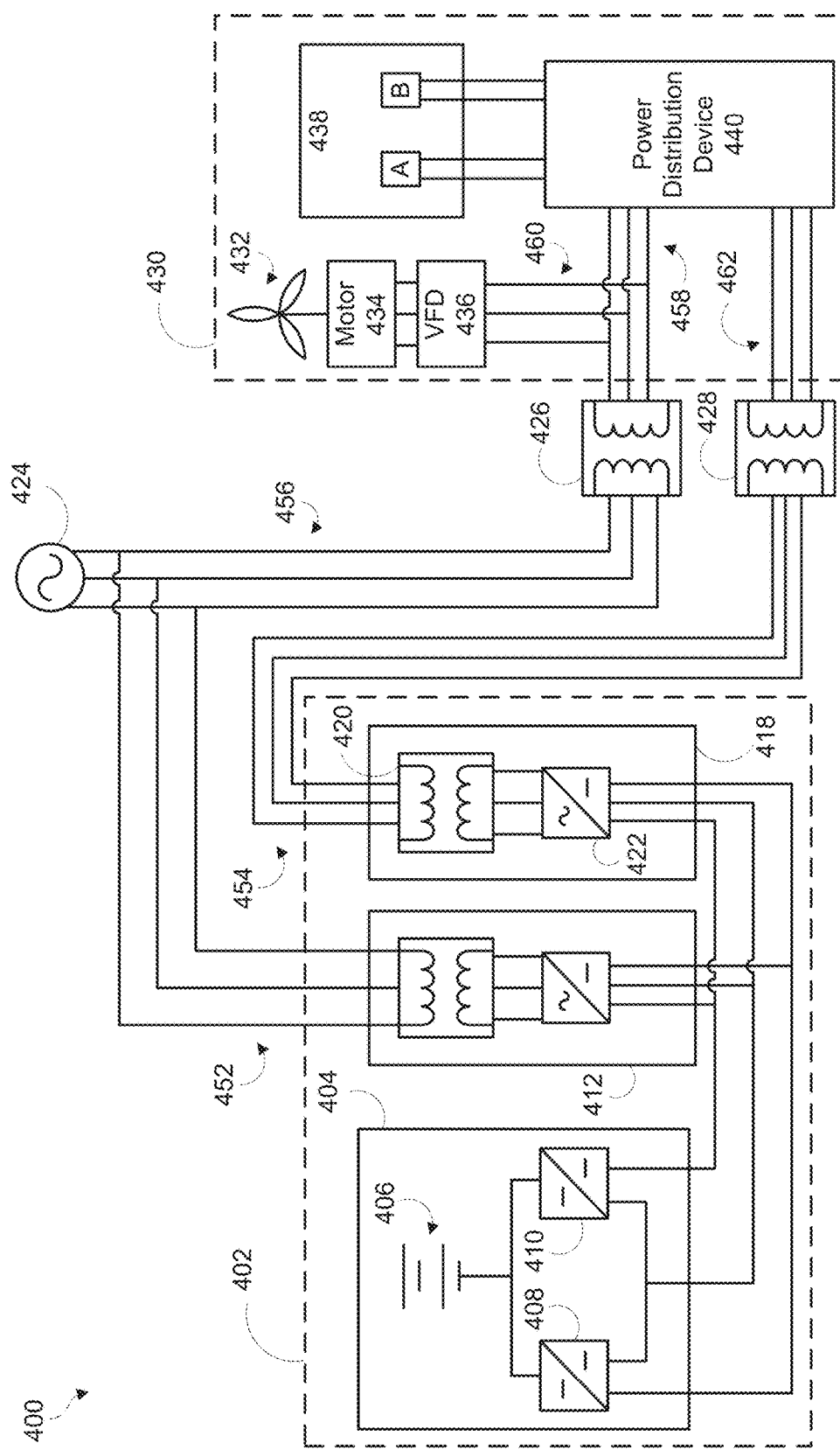
FIG. 4 is a schematic illustration of an energy power supply system connected to an electrical load module according to another embodiment of the present disclosure.

FIG. 4 is a schematic illustration of an energy power supply system connected to an electrical load module according to another embodiment of the present disclosure.

Referring to FIG. 4, an electrical power system 400 includes an alternative power source system 402, a utility grid node 424, a first transformer 426, a second transformer 428, and an electrical load module 430.

The alternative power source system 402 includes one or more power generation components (e.g., power generation component 404) and one or more power conditioning components (e.g., first power conditioning component 412 and second power conditioning component 418). The power generation component 404 and the first power conditioning component 412 are similar to power generation component 204 and power conditioning component 212, respectively, illustrated in FIG. 2. Accordingly, a description of these elements is omitted for brevity.

The second power conditioning component 418 is configured to modify or condition one or more properties of the power generated by the power generation component 404. The second power conditioning component 418 includes one or more power conditioning elements. The power conditioning elements may include components for converting DC power to different AC voltages and/or frequencies (e.g., third power conditioning element 422 and fourth conditioning element 420), electrical connectors including connectors to a DC microgrid and AC power output connectors, circuits for managing electrical transients, a system controller, etc.

In an exemplary embodiment, the second power conditioning component 418 may be a UPM and include an energy storage module including an energy storing device such as a bank of supercapacitors, batteries, flywheel, etc. The energy storage module may be electrically connected to the power generation module 406 and/or the first power conditioning component 408 and/or the second power conditioning component 410. The third power conditioning element 422 of the power conditioning component 418 may be one or more DC/AC inverters such as an array of DC/AC inverters. The fourth power conditioning element 420 of the power conditioning component 418 may be a transformer. In addition, while not illustrated, the power conditioning component may further include an input rectifier where the input rectifier can be an input diode connected between the output of a DC bus from the power generation components 406 of the alternative power source system 402 and the input of at least one DC/AC inverter 422.

In operation, a first feed of the power generated by the alternative power source system 402 migrates via transmission link(s) 452 and combines with power transmitted from the utility grid node 424 at a junction (e.g., junction 316). The combined power transmitted from the alternative power source system 402 and the utility grid node 424 migrates to the first transformer 426 via transmission link(s) 456 and the transformed, combined power output from the first transformer 426 is provided to a first input port of the electrical load module 430.

The second feed of the power generated by the alternative power source system 402 migrates via transmission link(s) 454 to the second transformer 428. The transformed power output from the second transformer 428 is provided to a second input port of the electrical load module 430.

In an exemplary embodiment, the power transmitted from the first power conditioning component 412 and the second power conditioning component 418 of alternative power source system 402 and the utility grid node 424 is 480VAC where transformers 426 and 428 transform the power into 400-415VAC, before the two power feeds are provided to the electrical load module 430.

The power distribution device 440 is configured to receive the plurality of AC power feeds. Specifically, the power distribution device 440 receives the AC power transmitted from the first power conditioning component 412 of the alternative power source system 402 and/or the utility grid node 424 via first connector(s) 458 and the AC power transmitted from the second power conditioning component of the alternative power source system 402 via second connector(s) 462. The power distribution device then provides power to power supply A and power supply B such that power supply A and power supply B power the electrical load component 438.

When the electrical load module 430 includes a fan 432, a motor 434, and a VFD 436, the VFD 436 is coupled to the first connector(s) 460 such that the motor 434 utilizes the power transmitted from the first power conditioning component 412 of the alternative power source system 402 and/or the utility grid node 424 to actuate the fan 432.

Figure 5:
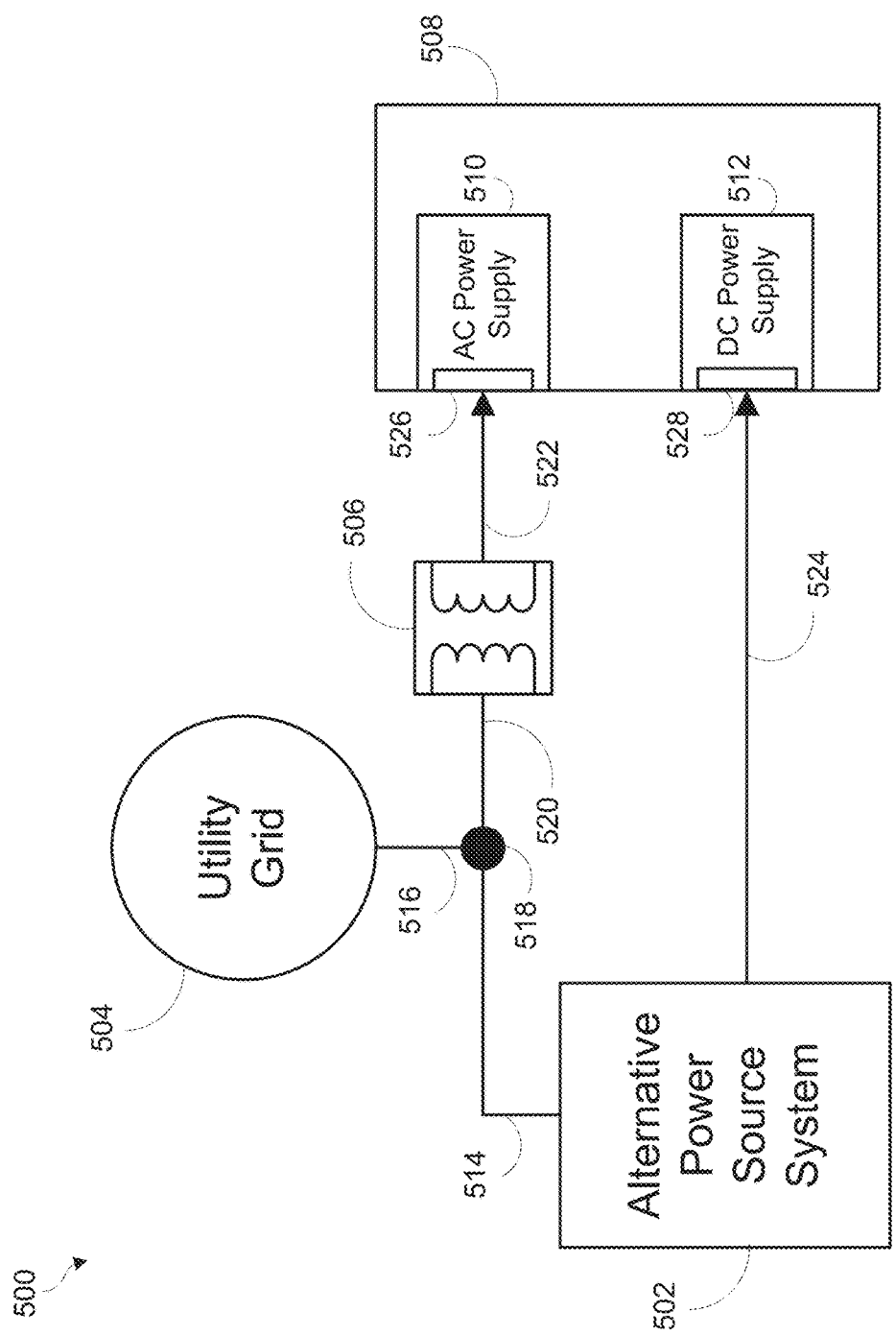
FIG. 5 is a block diagram illustrating an energy power supply system connected to an electrical load module according to another embodiment of the present disclosure.

FIG. 5 is a block diagram illustrating an energy power supply system connected to an electrical load module according to another embodiment of the present disclosure.

Referring to FIG. 5, an electrical power system 500 includes an alternative power source system 502, a utility grid node 504, a transformer 506, and an electrical load module 508.

In the electrical power system 500, a DC power feed generated by the alternative power source system 502 is directly integrated with the electrical load module 508. For example, the alternative power source system 502 transmits DC power generated by a power generation component of the alternative power source system 502 to a DC input port 528 of the electrical load module 508 via transmission link 524. The DC power received at the DC input port 528 of the electrical load module 508 is then provided to a DC power supply 512.

In addition, the alternative power source system 502 generates AC power that is combined with the AC power transmitted from the utility grid node 504 before being provided to the electrical load module 508. For example, the AC power feed is transmitted from the alternative power source system 502 via transmission link 514 to junction 518 where the AC power feed is combined with the AC power transmitted from the utility grid node 504 via transmission link 516. The combined AC power is then transmitted via transmission link 520 to the optional transformer 506. The transformed, combined AC power is then provided to an AC input port 526 of the electrical load module 508 via transmission link 522. The AC power received at the AC input port 526 of the electrical load module 508 is then provided to an AC power supply 510 where at least one electrical load component of the electrical load module 508 is powered by the AC power supply 510 and the DC power supply 512.

By omitting additional components coupled between an output of the alternative power source system 502 and the DC power supply 512 input of the electrical load module 508, the overall efficiency of electrical power system 500 may increase by reducing the number of times the distributed power is conditioned before the power is consumed.

Properties of the AC power transmitted over the AC power feed of the alternative power source system 502 may be the same, substantially similar, or different from the properties of the DC power transmitted over the DC power feed of the alternative power source system 502. For example, the peak voltage level of the AC power feed may be less than or greater than the voltage level of the DC power feed. In an exemplary embodiment, the peak voltage level of the AC power transmitted over the AC power feed may be greater than the voltage level of the DC power transmitted over the DC power feed. In addition, the peak voltage level of the AC power feed and/or the voltage level of the DC power feed may be different from a voltage used by the AC power supply 510 and/or the DC power supply 512, respectively.

Figure 6:
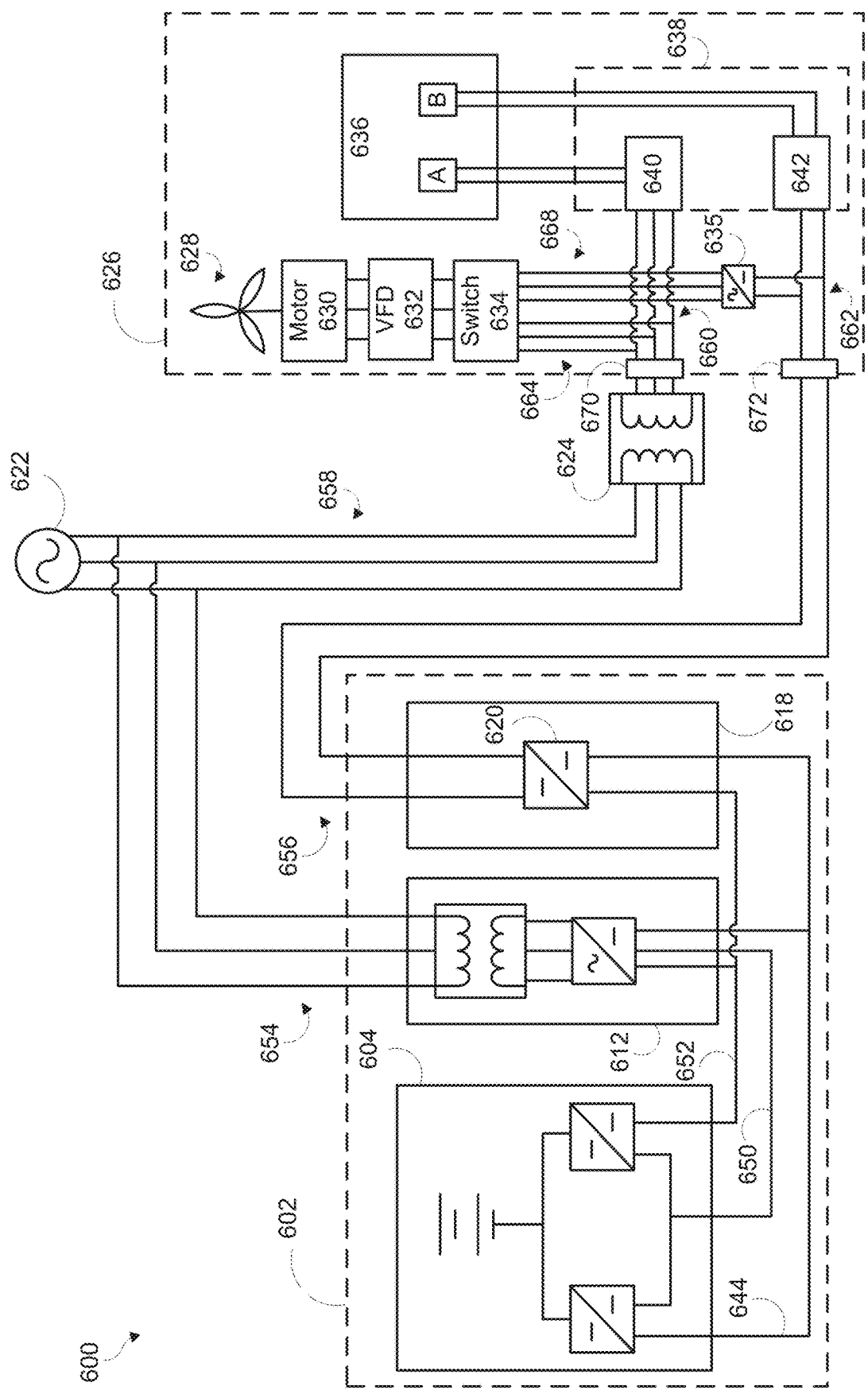
FIG. 6 is a schematic illustration of an energy power supply system connected to an electrical load module according to another embodiment of the present disclosure.

FIG. 6 is a more detailed schematic illustration of an energy power supply system connected to an electrical load module according to the embodiment of the present disclosure shown in FIG. 5.

Referring to FIG. 6, an electrical power system 600 includes an alternative power source system 602, a utility grid node 622, a transformer 624, and an electrical load module 626.

The alternative power source system 602 includes one or more power generation components (e.g., power generation component 604) and one or more power conditioning components (e.g., first power conditioning component 612 and second power conditioning component 618). The power generation component 604 and the first power conditioning component 612 are similar to power generation component 204 and the power conditioning component 212, respectively, illustrated in FIG. 2. Accordingly, a description of these elements is omitted for brevity.

The second power conditioning component 618 is configured to modify or condition one or more properties of the power generated by the power generation component 604. The second power conditioning component 618 includes one or more power conditioning elements. The power conditioning elements may include one or more DC/DC converters, electrical connectors, circuits for managing electrical transients, a system controller, etc.

The second power conditioning component 618 may include one or more power conditioning elements 620 such as a DC/DC converter configured to convert the voltage level of the DC power generated by the power generation component 604 to a different voltage level. In an exemplary embodiment, the second power conditioning component 618 may be a standalone DC microgrid component such as an auxiliary output module (AOM). In one embodiment, the second power conditioning component 618 lacks a DC/AC inverter and thus outputs DC power upon receiving DC power from the power generation component 604.

The second power conditioning component 618 may be coupled to the power generation component 604 in various ways. Referring to FIG. 6, the second power conditioning component 618 is coupled to the power generation component 604 using a separate positive, neutral, and negative buses (i.e., links). For example, the second power conditioning component 618 is connected to a positive output port of the power generation component 604 via connector (e.g., positive bus) 644 and a negative output port of the power generation component 604 via connector (e.g., negative bus) 652. Alternatively, the second power conditioning component 618 may be connected to the positive or negative output port of the power generation component 604 via connector 644 and a neutral output of the power generation component 604 via connector (e.g., neutral bus) 650. Connector 650 connects to positive and negative outputs of the power generation component 604.

In operation, AC power generated by the alternative power source system 602 migrates from the first power conditioning component 612 via transmission link(s) 654 and combines with power transmitted from the utility grid node 622 at a junction. The combined power transmitted from the AC power feed of the alternative power source system 602 and the utility grid node 622 migrates to the transformer 624 via transmission link(s) 658 and the transformed, combined AC power output from the transformer 624 is provided to a first input port 670 (e.g., AC input port) of the electrical load module 626. The DC power transmitted by the alternative power source system 602 directly migrates to the electrical load module 626 from the second power conditioning component 618 via transmission link(s) 656 where the DC power is provided to a second input port 672 (e.g., DC input port) of the electrical load module 626.

In an exemplary embodiment, the AC power transmitted from the first power conditioning component 612 and the utility grid node 622 may be 480VAC where the transformer 624 transforms the AC power into 400-415VAC before the AC power feed is provided to the electrical load module 626. In addition, the DC power transmitted from the second power conditioning component 618 may be 380VDC.

The power distribution device 638 is electrically coupled to the first input port 670 of the electrical load module 626 via first connector(s) 660 where at least a portion of the AC power provided to the electrical load module 626 is transmitted to the AC power distribution element 640. In addition, the power distribution device 638 is electrically coupled to the second input port 672 of the electrical load module 626 via second connector(s) 662 where at least a portion of the DC power provided to the electrical load module 626 is transmitted to the DC power distribution element 642. The AC power distribution element 640 and the DC power distribution element 642 may include one or more components configured to condition and/or distribute the AC power and the DC power, respectively.

AC power is provided to power supply A from the AC power distribution element 640 of the power distribution device 638. DC power is provided to power supply B from the DC power distribution element 642 of the power distribution device 638. The electrical load component 636 is electrically coupled to power supply A and power supply B where the electrical load component 636 is powered by power supply A and power supply B.

In an exemplary embodiment, power supply A and power supply B may use different voltage levels to power the electrical load component. For example, power supply A may use 240VAC to power the electrical load component 636 and power supply B may use 380VDC to power the electrical load component 636.

Optionally, the electrical load module 626 may further include additional components such as a fan 628, a motor 630, a VFD 632, and a switch 634. Switch 634 is configured to alternatively couple the VFD 632 with AC power and DC power. Specifically, referring to FIG. 6, switch 634 is coupled to the first connector(s) 660 and the second connector(s) 662. When the switch 634 is selectively coupled to the first connector(s) 660 via connector(s) 664, a portion of the AC power provided at the first input port 670 of the electrical load module 626 migrates to the VFD 632 to power the motor 630 using AC power. When the switch 634 is optionally selectively coupled to the second connector(s) 662 via connector(s) 668, a portion of the DC power provided at the second input port 672 of the electrical load module 626 migrates to the VFD 632 via optional DC/AC inverter 635 where the portion of the DC power provided to the electrical load module 626 is converted to AC power to power the motor 630.

In an exemplary embodiment, the switch 634 may be selectively coupled between the first connector(s) 660 and the second connector(s) 662 based on availability of power from the utility grid node 622. For example, when power is available from the utility grid node 622, the switch 634 may be coupled with the first connector(s) 660 such that the motor 630 is powered using AC power provided at the first input port 670. Alternatively, if a loss of power is detected from the utility grid node 622, the switch 634 may be articulated to be coupled with the second connector(s) 662 such that the motor 630 is powered using DC power provided at the second input port 672. However, the switch 634 may also be articulated between the first connector(s) 660 and the second connector(s) 662 in response to a user input received within the electrical power system 600 or other conditions or parameters detected within the electrical power system 600 (e.g., environmental factors, power usage, temperatures, etc.).

In an exemplary embodiment, the DC/AC inverter 635 may convert the 380VDC power provided at the second input port 672 of the electrical load module 626 to 400VAC where the motor 632 is powered using 400VAC. The embodiment illustrated in FIG. 6 increases the efficiency of the electrical load module 626 and/or reduces the complexity of the electrical power system 600 by omitting a second AC input including a corresponding inverter and transformer and directly integrating DC power generated by the alternative power source system 602 with the electrical load module 626.

Figure 7:
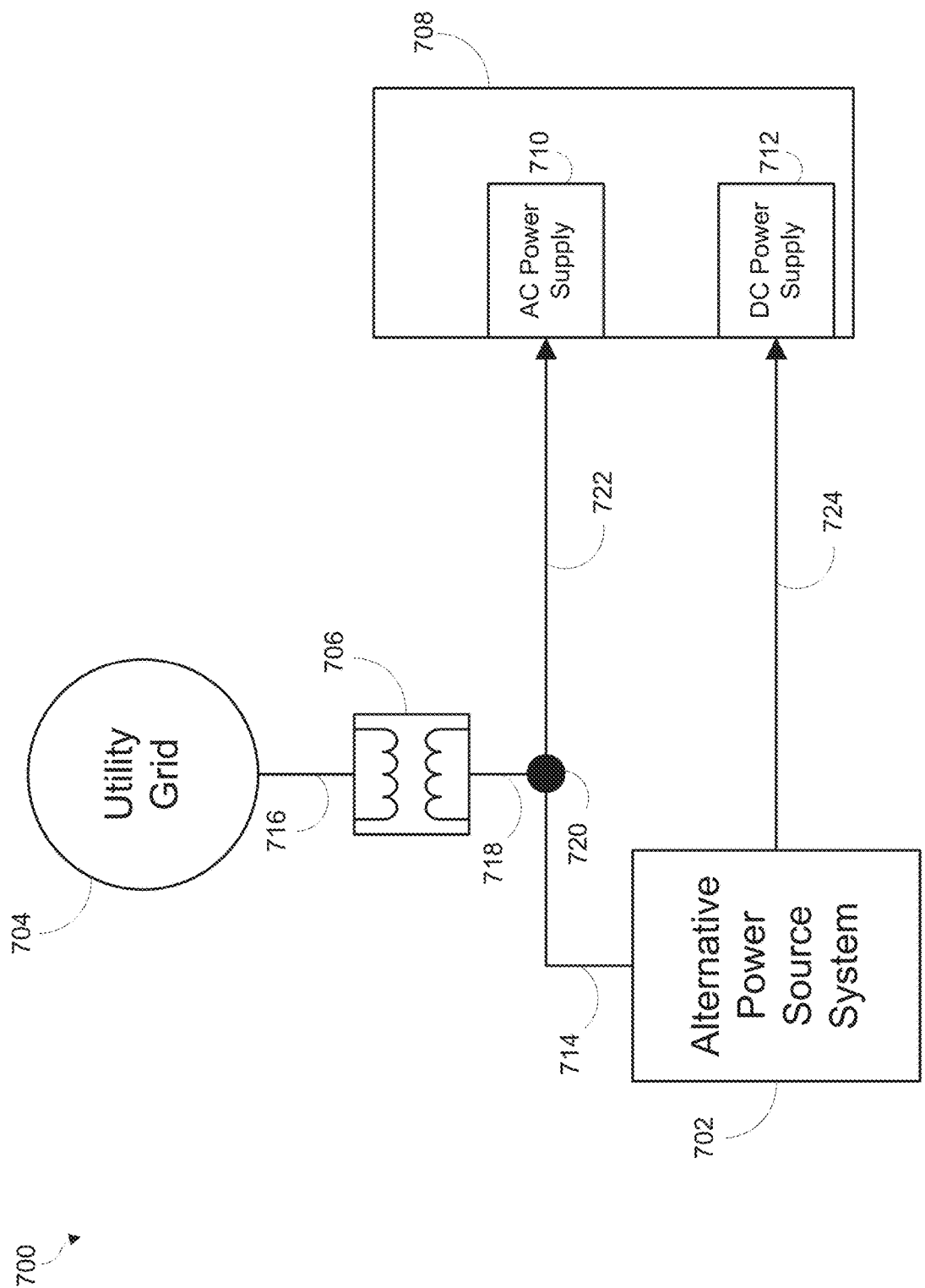
FIG. 7 is a block diagram illustrating an energy power supply system connected to an electrical load module according to another embodiment of the present disclosure.

FIG. 7 is a block diagram illustrating an energy power supply system connected to an electrical load module according to another embodiment of the present disclosure.

Referring to FIG. 7, an electrical power system 700 includes an alternative power source system 702, a utility grid node 704, a transformer 706, and an electrical load module 708.

In the electrical power system 700, transformers are omitted from an AC power feed between the alternative power source system 702 and the electrical load module 708. For example, AC power transmitted from the utility grid node 704 may be transformed by transformer 706 in a switchgear located upstream from junction 720.

Specifically, the utility grid node 704 transmits AC power having a first voltage level via transmission link 716 to transformer 706 where the transformer 706 converts the AC power to a second voltage level. The transformed AC power migrates from the transformer 706 to the junction 720 via transmission link 718. The alternative power source system 702 transmits AC power at the second voltage level via transmission link 714 where the second voltage level may be the AC voltage level at which the electrical load module 708 and the AC power supply 710 operate (e.g., no need to boost or buck the power level). The AC power transmitted by the alternative power source system 702 is combined with the transformed AC power at junction 720. The combined AC power is then transmitted to a first port of the electrical load module 708 via transmission link 722. The DC power generated by the alternative power source system 702 is transmitted to a second port of the electrical load module 708 via transmission link 724. The AC power received at the first input port of the electrical load module 708 is provided to an AC power supply 710 and the DC power received at the second input port of the electrical load module 708 is provided to a DC power supply 712 where at least one electrical load component of the electrical load module 708 is powered by the AC power supply 710 and the DC power supply 712.

Figure 8:
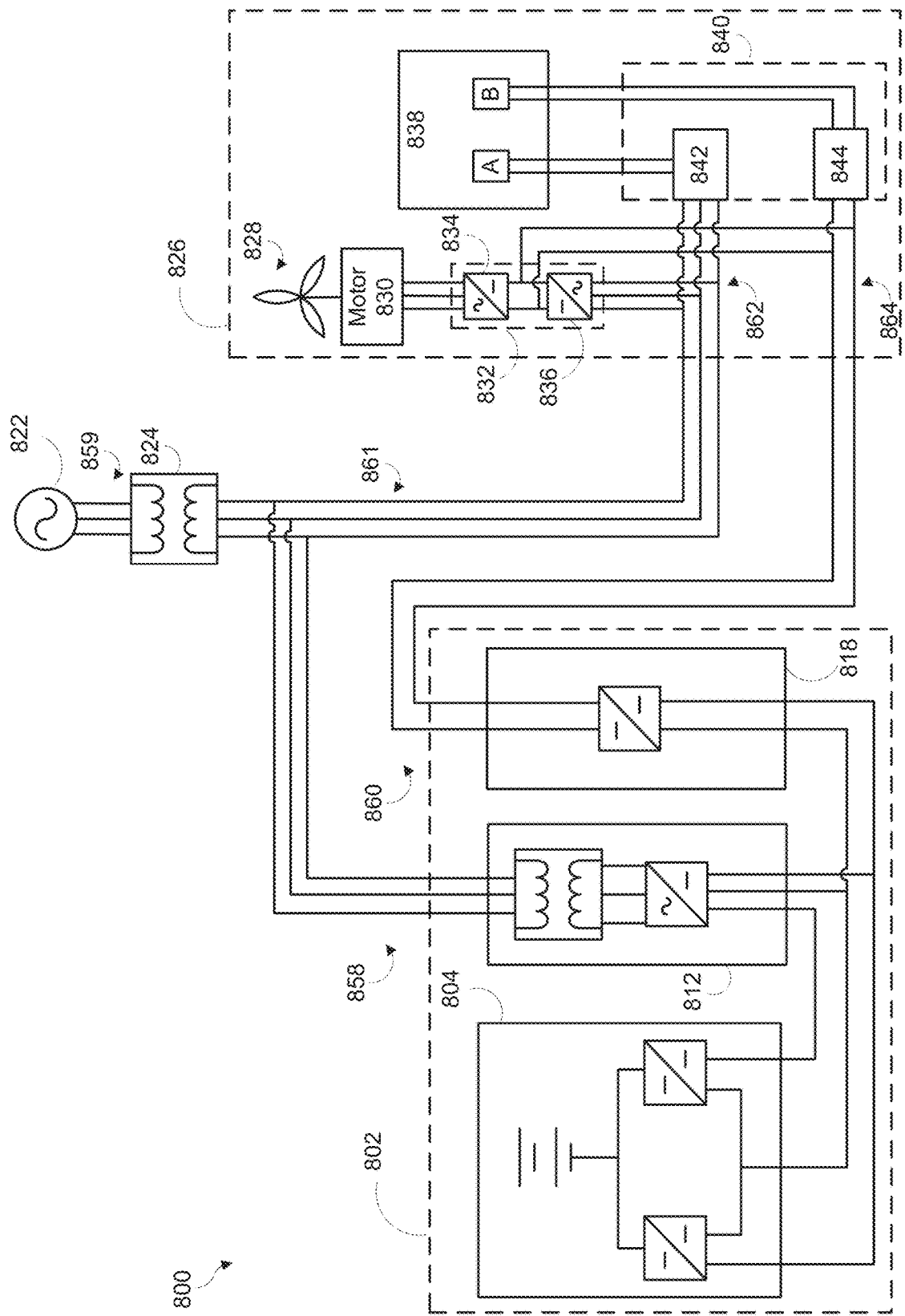
FIG. 8 is a schematic illustration of an energy power supply system connected to an electrical load module according to another embodiment of the present disclosure.

FIG. 8 is a more detailed schematic illustration of an energy power supply system connected to an electrical load module according to the embodiment of the present disclosure shown in FIG. 7.

Referring to FIG. 8, an electrical power system 800 includes an alternative power source system 802, a utility grid node 822, a transformer 824, and an electrical load module 826.

The alternative power source system 802 includes one or more power generation components (e.g., power generation component 804) and one or more power conditioning components (e.g., first power conditioning component 812 and second power conditioning component 818). The power generation component 804, the first power conditioning component 812, and the second power conditioning component 818 are similar to the power generation component 604, the first power conditioning component 612, and the second power conditioning component 618, respectively, illustrated in FIG. 6. Accordingly, a description of these elements is omitted for brevity. In an exemplary embodiment, the second power conditioning component 818 may be an AOM.

In operation, the AC power transmitted by utility grid node 822 migrates via transmission link(s) 859 to transformer 824 in an upstream switchgear where the AC power is transformed. The AC power generated by the alternative power source system 802 migrates from the first power conditioning component 812 via transmission link(s) 858 and is combined with the transformed AC power output from the transformer 824. The combined AC power is then provided to a first input port of the electrical load module 826 via transmission link(s) 861. The DC power transmitted by the alternative power source system 802 migrates from the second power conditioning component 818 via transmission link(s) 860 to a second input port of the electrical load module 826.

In an exemplary embodiment, the AC power transmitted by the alternative power source system 802 and the transformed AC power output from the transformer 824 may be 400VAC. In addition, the DC power transmitted from the second power conditioning component 818 may be 380VDC.

The power distribution device 840 is electrically coupled to the first input port of the electrical load module 826 via first connector(s) 862 where at least a portion of the AC power provided to the electrical load module 826 is transmitted to the AC power distribution element 842. In addition, the power distribution device 826 is electrically coupled to the second input port of the electrical load module 826 via second connector(s) 864 where at least a portion of the DC power provided to the electrical load module 626 is transmitted to the DC power distribution element 844.

AC power is provided to power supply A from the AC power distribution element 842 of the power distribution device 840. DC power is provided to power supply B from the DC power distribution element 844 of the power distribution device 840. The electrical load component 838 is electrically coupled to power supply A and power supply B where the electrical load component 838 is powered by power supply A and power supply B.

Optionally, the electrical load module 826 may further include additional components such as a fan 828, a motor 830, and a VFD 832. The VFD 832 may include a first power conditioning element 834, a second power conditioning element 836, and a middle point between the first power conditioning element 834 and the second power conditioning element 836.

In an exemplary embodiment, the first conditioning element 834 is a DC/AC inverter and the second conditioning element 836 is a rectifier where the input of the rectifier is coupled to the first connector(s) 862. In addition, the middle point of the VFD 832 is coupled to the second connector(s) 864.

The embodiment illustrated in FIG. 8 increases the efficiency of the electrical load module 826 and/or reduces the complexity of the electrical power system 800 by omitting all transformers between the electrical load module 826 and the corresponding substation of the distribution grid. One advantage of this configuration is that the voltage of both the AC grid feed and the DC grid feed may be the same before coupling with the electrical load module 826. In addition, the VFD 832 may be coupled to both the AC power and DC power such that a switch is not required for operation. By doing this, the VFD 832 may directly utilize the power generated by the alternative power source system 802 without a need for additional power conditioning elements.

Figure 9:
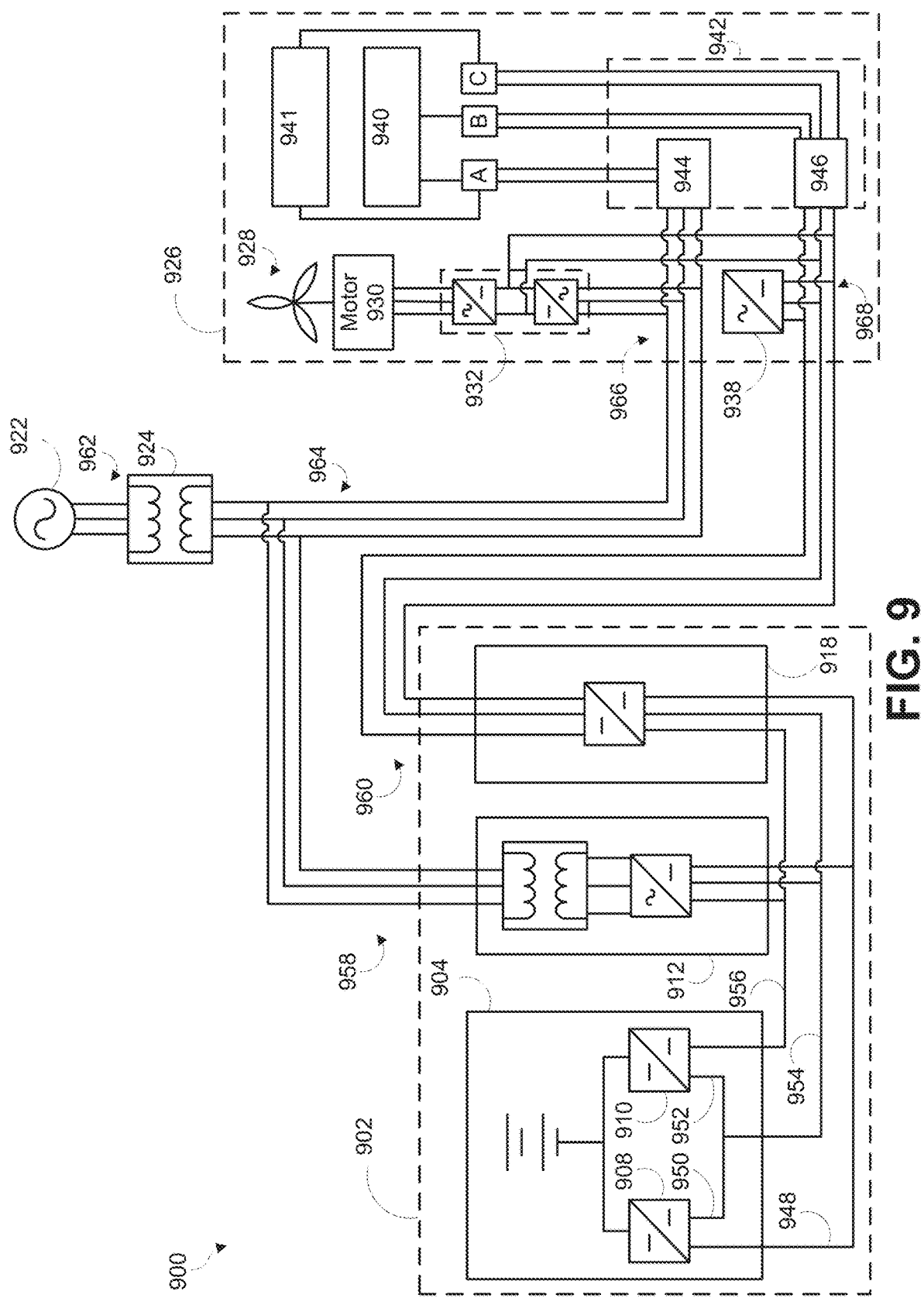
FIG. 9 is a schematic illustration of an energy power supply system connected to an electrical load module according to another embodiment of the present disclosure.

FIG. 9 is a schematic illustration of an energy supply system connected to an electrical load module according to another embodiment of the present disclosure.

Referring to FIG. 9, an electrical power system 900 includes an alternative power source system 902, a utility grid node 922, a transformer 924, and an electrical load module 926.

The alternative power source system 902 includes one or more power generation components (e.g., power generation component 904) and one or more power conditioning components (e.g., first power conditioning component 912 and second power conditioning component 918). The power generation component 904, the first power conditioning component 912, and the second power conditioning component are similar to power generation component 604, the first power conditioning component 612, and the second power conditioning component 618, respectively, illustrated in FIG. 6. Accordingly a description of these elements is omitted for brevity.

However, the second power conditioning component 918 is coupled to the power generation component 904 and the electrical load module 926 using a tri-connector (e.g., three-phase) configuration. For example, the second power conditioning component 918 may provide a three-phase input to the electrical load module 926 where the DC power fed to the electrical load module 926 includes a positive voltage component, a negative voltage component, and a neutral component.

Specifically, the second power conditioning component 918 is coupled to a positive output port of the first power conditioning element 908 via connector 948, a negative output port of the second power conditioning element 910 of the power generation component 904 via connector 956, and a neutral output via connector 954 where connector 954 is coupled to a negative output of the first power conditioning element 908 via connector 950 and a positive output of the second power conditioning element 910 via connector 952. The DC power output from the second power conditioning component 918 includes a positive component, a negative component, and a neutral component where the DC power migrates from the second power conditioning component 918 to the electrical load module 926 via transmission link(s) 960.

In operation, AC power transmitted by utility grid node 922 migrates via transmission link(s) 962 to transformer 924 in an upstream switchgear where the AC power is transformed. The AC power generated by the alternative power source system 902 migrates via transmission link(s) 958 and is combined with the transformed AC power output from the transformer 924. The combined AC power is then provided via transmission link(s) 964 at a first input port of the electrical load module 926. The DC power transmitted by the alternative power source system 902 migrates via transmission link(s) 960 to a second input port of the electrical load module 926.

In an exemplary embodiment, the AC power transmitted by the alternative power source system 902 and the transformed AC power output from the transformer 924 may be 400VAC. In addition, the DC power transmitted from the power conditioning component 918 may be 380VDC where the positive component may be +380VDC or +190VDC and the negative component may be −380VDC or −190VDC.

The power distribution device 942 is electrically coupled to the first input port of the electrical load module 926 via first connector(s) 966 where at least a portion of the AC power provided to the electrical load module 926 is transmitted to the AC power distribution element 944. In addition, the power distribution device 942 is electrically coupled to the second input port of the electrical load module 926 via second connector(s) 968 where at least a portion of the DC power provided to the electrical load module 926 is transmitted to the DC power distribution element 946.

AC power is provided to power supply A from the from the AC power distribution element 944 of the power distribution device 942. A first portion of DC power is provided to power supply B from the DC power distribution element 946 of the power distribution device 942 and a second portion of DC power is provided to power supply C from the DC power distribution element 946 of the power distribution device 942. In an exemplary embodiment, power supply B receives the positive DC power component and power supply C receives the negative DC power component.

A first electrical load component 940 is coupled to power supply A and power supply B where the first electrical load component 940 is powered by the AC power provided by power supply A and the positive DC power provided by power supply B. A second electrical load component 941 is coupled to power supply A and power supply C where the second electrical load component 941 is powered by the AC power provided by power supply A and the negative DC power provided by power supply C.

The electrical load module 926 may include any number of electrical load components coupled to power supply A and power supply B or power supply C. In an exemplary embodiment, when the electrical load module 926 includes a plurality of electrical load components coupled to power supply A and power supply B or power supply C, approximately half of the plurality of electrical load components may be coupled to power supply A and power supply B and approximately half of the plurality of electrical load components may be coupled to power supply A and power supply C.

In this embodiment, the electrical load module 926 may further include an additional power conditioning element 938. For example, the power conditioning element 938 may be coupled to the second connector 968 and to any additional electrical load components where the power conditioning element 938 may be a DC/AC inverter which provides AC power to the additional electrical load components. In an exemplary embodiment, the power conditioning element 938 may convert the ±380VDC power provided at the second input of the electrical load module 926 to 400VAC for auxiliary electrical loads as needed or desired.

When the electrical load module 926 includes a fan 928, a motor 930, and a VFD 932, the fan 928, the motor 930, and the VFD 932 are similar to the fan 828, the motor 830, and the VFD 832, respectively, illustrated in FIG. 8. Accordingly, a description of these elements is omitted for brevity.

Figure 10:
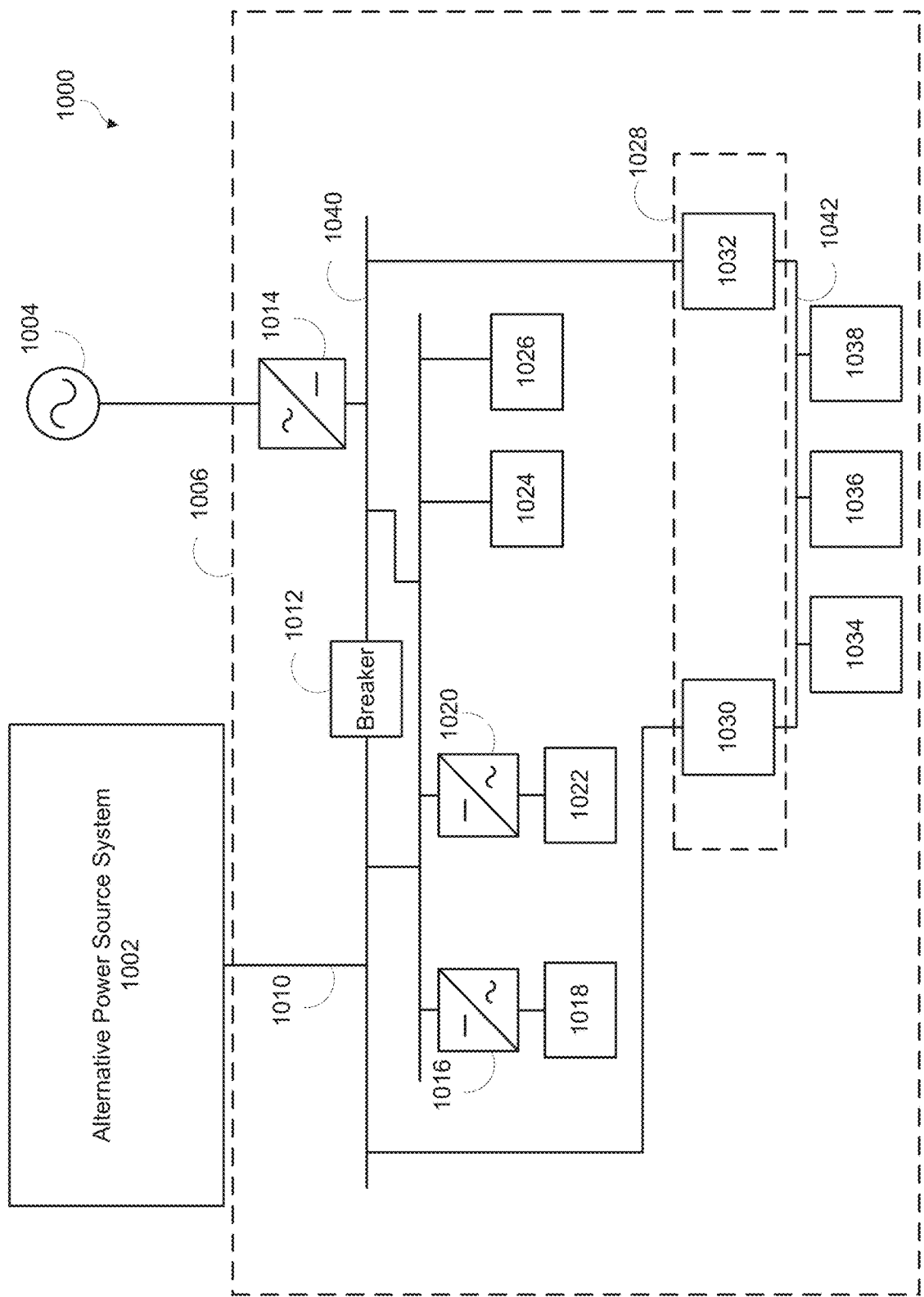
FIG. 10 is a schematic illustration of an energy power supply system connected to an electrical load module according to another embodiment of the present disclosure.

FIG. 10 is a schematic illustration of an energy power supply system connected to an electrical load module according to another embodiment of the present disclosure.

Referring to FIG. 10, an electrical power system 1000 includes an alternative power source system 1002, a utility grid node 1004, and an electrical load module 1006.

The alternative power source system 1002 may include one or more power generation components and one or more power distribution components. In an exemplary embodiment, the alternative power source system 1002 includes at least one power generation component and one or more power conditioning components. For example, the alternative power source system 1002 may include components such as power generation component 604 and the second power conditioning component 618, as illustrated in FIG. 6. Accordingly, a description of these elements is omitted for brevity.

The electrical load module 1006 may include a sectionalizer breaker 1012, a rectifier (e.g., a power factor correction (PFC) rectifier) 1014, a first power conditioning element 1016, a first electrical load component 1018, a second power conditioning element 1020, a second electrical load component 1022, a third electrical load component 1024, a fourth electrical load component 1026, a power distribution device 1028, and a plurality of electrical load components 1034, 1036, 1038.

While not illustrated in FIG. 10, the electrical load module 1006 may further include a logic system (e.g., controller or processor) that controls the operation of the electrical power system 1000. For example, the logic system may manage an input of the rectifier 1014 to the first DC bus 1040 with the feeds from the alternative power source system 1002. For example, the logic system may selectively drive a power load provided from the alternative power source system 1002 to reduce losses in a length of the first DC bus feed 1040 through the system. Alternatively, or additionally, the logic system may reduce current across the sectionalizer breaker 1012 for opening under a load. The logic system may also split pulse width modulations to support different types of electrical load components. For example, the logic system may designate power loads to the different types of electrical load components (e.g., electrical load components that utilize AC power and electrical load components that utilize DC power) by performing ratio matching based on the design value of the power usage effectiveness (PUE) of the electrical load module 1006.

In operation, the alternative power source system 1002 is coupled to a first DC bus 1040 of the electrical load module 1006 via connector 1010. The utility grid node 1004 is coupled to the first DC bus 1040 via rectifier 1014 where the rectifier 1014 converts AC power transmitted from the utility grid node 1004 to DC power and the DC power is output from the rectifier 1014 and provided to the first DC bus 1040.

In an exemplary embodiment, the alternative power source system 1002 may provide ±380VAC power to the electrical load module 1006. In addition, power may be distributed by the first DC bus 1040 at a voltage of 380VDC, ±190VDC, or 0, 380VDC.

For electrical load components that consume AC power (e.g., the first electrical load component 1018 and the second electrical load component 1022), power conditioning elements, such as DC/AC inverters (e.g., the first power conditioning element 1016 and the second power conditioning element 1020) may be coupled between the first DC bus 1040 and the AC electrical load components. In addition, electrical load components that consume DC power such as additional facility or fuel cell balance of plant components shown in FIG. 11 and described below (e.g., the third electrical load component 1024 and the fourth electrical load component 1026) may be coupled to the first DC bus 1040.

The electrical load module 1006 further includes a power distribution device 1028. The power distribution device 1028 is configured to provide power to the plurality of electrical load components 1034, 1036, and 1038 such as IT racks (e.g., computer servers). The power distribution device 1028 may include at least two power supplies (e.g., first power supply 1030 and second power supply 1032). In addition, the first power supply 1030 and the second power supply 1032 may include one or more power conditioning elements such as DC/DC converters.

The first power supply 1030 and the second power supply 1032 are coupled to the first DC bus 1040 and provide power to the plurality of electrical load components 1034, 1036, 1038 via a second DC bus 1042. In an exemplary embodiment, each of the plurality of electrical load components 1034, 1036, 1038 are powered using power provided by the first power supply 1030 and the second power supply 1032.

The embodiment illustrated in FIG. 10 allows for a close-coupled integration between the alternative power source system 1002 and the electrical load module 1006. For example, the efficiency of the electrical power system 1000 may be increased and/or the complexity of the electrical power system 1000 may be reduced by eliminating transfer switches and/or transformers within the local grid feed. In order to optimize the power supplied by the alternative power source system 1002 at the point of use (e.g., the electrical load module 1006), if an output of 400 VAC is already available from the alternative power source system 1002, no step up or step down transformers are necessary. Eliminating transfer switches and/or transformers and implementing the first DC bus 1040 as well as packaging concepts discussed above may reduce the need for HVAC/mechanical load inrush reduction measures and/or provide for a higher mechanical and/or electrical efficiency of the electrical power system 1000. For example, in contrast to FIGS. 1-9, the AC power output from the utility grid node 1004 is coupled to an input port of the electrical load module 1006 where a transformer between the utility grid node 1004 output and an input port of the electrical load module 1006 is omitted thereby reducing the number of components used in the electrical power system 1000.

In addition, the first DC bus 1040 makes it easier to connect the power supplies (e.g., power supplies 1030 and 1032) in parallel, eliminates the need for implementing inrush current capabilities within the electrical load module 1006, even for HVAC loads, eliminates the need for a transfer switch, and allows for "Main-Tie-Main" type power distribution by implementing the sectionalizer breaker 1012. For example, the sectionalizer breaker 1012 may operate in a normal mode, a maintenance mode, a load balancing mode, or a load prioritization mode.

In an exemplary embodiment, the electrical load module 1006 may be associated with an information technology (IT) pod or facility. The IT pod may include various IT electrical load components such as any number of servers and IT support components (e.g., electrical-mechanical loads including fans, VFDs, motors, etc.) to regulate the temperature within the IT pod and/or the temperature of the IT components. In addition, the IT pod may include building facilities electrical loads (e.g., heating, ventilation, and air conditioning (HVAC) system elements, lights, etc.). A server of the IT pod may be any computing device having a processor and a memory that may be networked with other computing devices via an Internet and/or an Internet connection, and that may provide services to the networked other computing devices.

If the electrical load module 1006 is an IT pod or facility, electrical load components 1018, 1022, 1024, and 1026 may be associated with IT support or auxiliary components as well as building facility electrical loads. In addition, electrical loads components 1034, 1036, and 1038 may be any number of servers on IT racks. Power supplies 1030 and 1032 may be an integral component of each server 1034, 1036, and 1038, or the power supplies 1030 and 1032 may be external but in electrical communication with each server 1034, 1036, and 1038. For example, the power supplies 1030 and 1032 may be standalone connectable components or components of an IT rack configured to hold and arrange a plurality of servers.

Figure 11:
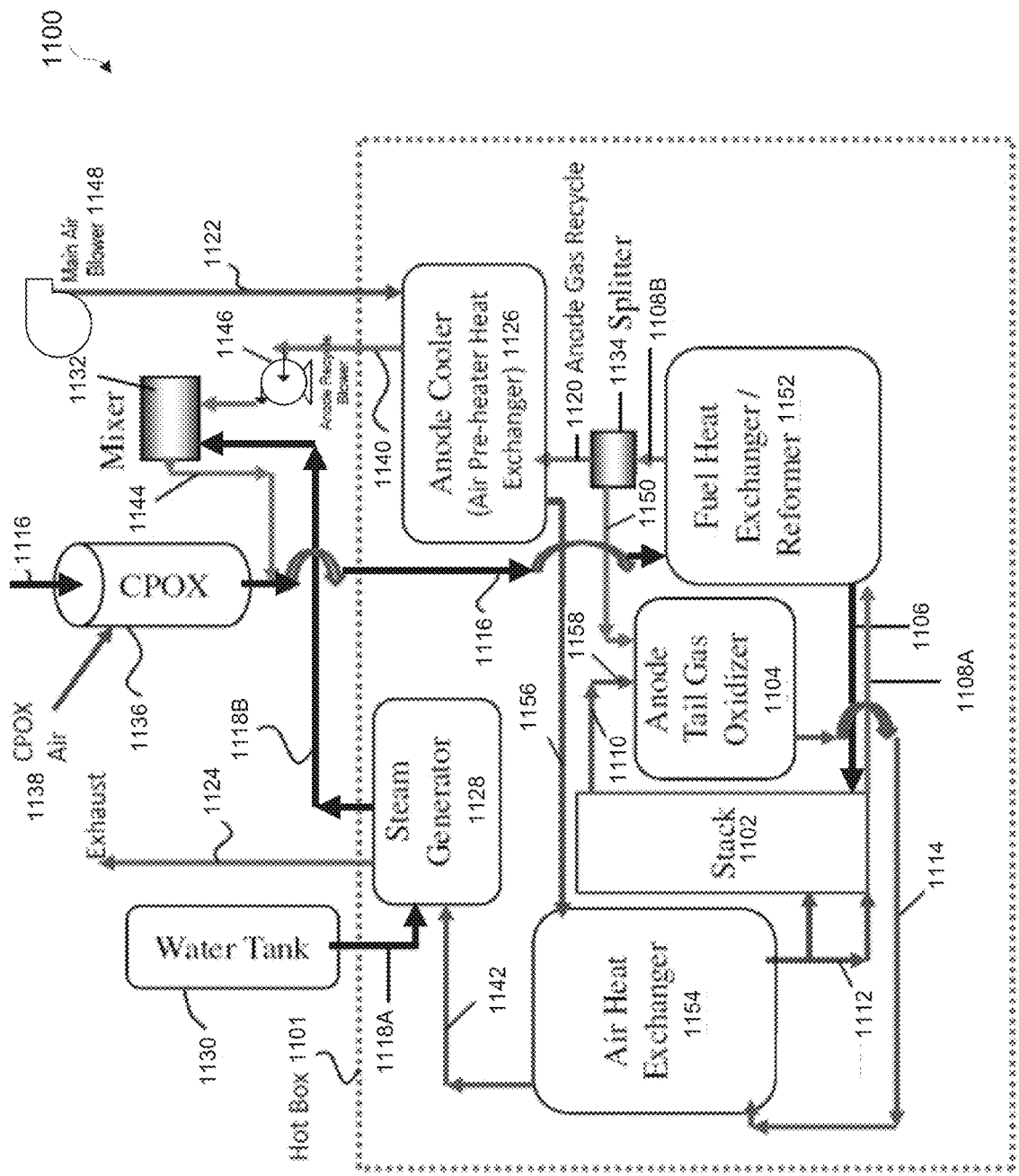
FIG. 11 is a block diagram illustration of a fuel cell system according to an embodiment of the present disclosure.

FIG. 11 is a block diagram illustration of a fuel cell system according to an embodiment of the present disclosure.

Referring to FIG. 11, a fuel cell system 1100 includes various components and flows which can be controlled according to present disclosure. Fuel cell system 1100 is also illustrated and described in U.S. application Ser. No. 14/054,010, filed Oct. 15, 2013, incorporated herein by reference. As illustrated in FIG. 11, fuel and air are supplied to a fuel cell stack 1102 housed in a hot box 1101. The hot box 1101 contains the plurality of the fuel cell stacks 1102, such as solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 1102 may be arranged over each other in a plurality of columns.

The hot box 1101 also contains a steam generator 1128. The steam generator 1128 is provided with water through conduit 1118A from a water source 1130, such as a water tank or a water pipe (i.e., a continuous water supply), and converts the water to steam. The steam is provided from generator 1128 to mixer 1132 through conduit 1118B and is mixed with the stack anode (fuel) recycle stream in the mixer 1132. The mixer 1132 may be located inside or outside of the hot box 1101. Preferably, the humidified anode exhaust stream is combined with the fuel inlet stream in the fuel inlet line or conduit 1116 downstream of the mixer 1132, as schematically shown in FIG. 11. Alternatively, if desired, the fuel inlet stream may also be provided directly into the mixer 1132, or the steam may be provided directly into the fuel inlet stream and/or the anode exhaust stream may be provided directly into the fuel inlet stream followed by humidification of the combined fuel streams.

The steam generator 1128 is heated by the hot anode tailgas oxidizer (ATO) 1104 exhaust stream which is passed in heat exchange relationship in conduit 1142 with the steam generator 1128.

The system operates as follows. The fuel inlet stream, such as a hydrocarbon stream, for example natural gas, is provided into the fuel inlet conduit 1116 and through a catalytic partial pressure oxidation (CPOx) reactor 1136 located outside the hot box 1101. During system start up, air is also provided into the CPOx reactor 1136 through CPOx air inlet conduit 1138 to catalytically partially oxidize the fuel inlet stream. During steady state system operation, the air flow is turned off and the CPOx reactor acts as a fuel passage way in which the fuel is not partially oxidized. Thus, the hot box 1101 may comprise only one fuel inlet conduit which provides fuel in both start-up and steady state modes through the CPOx reactor 1136. Therefore a separate fuel inlet conduit which bypasses the CPOx reactor during steady state operation is not required.

The fuel inlet stream is provided into the fuel heat exchanger (anode recuperator)/pre-reformer 1152 where its temperature is raised by heat exchange with the stack 1102 anode (fuel) exhaust stream. The fuel inlet stream is pre-reformed in the pre-reformer section of the heat exchanger 1152 via the SMR reaction and the reformed fuel inlet stream (which includes hydrogen, carbon monoxide, water vapor and unreformed methane) is provided into the stacks 1102 through the fuel inlet conduit(s) 1106. Additional reformation catalyst may be located in conduit(s) 1106. The fuel inlet stream travels upwards through the stacks through fuel inlet risers in the stacks 1102 and is oxidized in the stacks 1102 during electricity generation. The oxidized fuel (i.e., the anode or fuel exhaust stream) travels down the stacks 1102 through the fuel exhaust risers and is then exhausted from the stacks through the fuel exhaust conduit(s) 1108A into the fuel heat exchanger 1152.

In the fuel heat exchanger 1152, the anode exhaust stream heats the fuel inlet stream via heat exchange. The anode exhaust stream is then provided via the fuel exhaust conduit 1108B into a splitter 1134. A first portion of the anode exhaust stream is provided from the splitter 1134 into the ATO 1104 via conduit (e.g., slits) 1150.

A second portion of the anode exhaust stream is recycled from the splitter 1134 into the anode cooler 1126 and then into the fuel inlet stream. For example, the second portion of the anode exhaust stream is recycled through conduit 1120 into the anode cooler (i.e., air pre-heater heat exchanger) where the anode exhaust stream pre-heats the air inlet stream from conduit 1122. The anode exhaust stream is then provided by the anode recycle blower 1146 into the mixer 1132. The anode exhaust stream is humidified in the mixer 1132 by mixing with the steam provided from the steam generator 1128. The humidified anode exhaust stream is then provided from the mixer 1132 via humidified anode exhaust stream conduit 1144 into the fuel inlet conduit 1116 where it mixes with the fuel inlet stream.

The air inlet stream is provided by a main air blower 1148 from the air inlet conduit 1122 into the anode cooler heat exchanger 1126. The blower 1148 may comprise the single air flow controller for the entire system. In the anode cooler heat exchanger 1126, the air inlet stream is heated by the anode exhaust stream via heat exchange. The heated air inlet stream is then provided into the air heat exchanger (cathode recuperator 1154) via conduit 1156. The heated air inlet stream is provided from heat exchanger 1154 into the stack(s) 1102 via the air inlet conduit and/or manifold 1112.

The air passes through the stacks 1102 into the cathode exhaust conduit 1110 and through conduit 1110 and mixer 1158 into the ATO 1104. In the ATO 1104, the air exhaust stream oxidizes the split first portion of the anode exhaust stream from conduit 1150 to generate an ATO exhaust stream. The ATO exhaust stream is exhausted through the ATO exhaust conduit 1114 into the air heat exchanger 1154. The ATO exhaust stream heats air inlet stream in the air heat exchanger 1154 via heat exchange. The ATO exhaust stream (which is still above room temperature) is then provided from the air heat exchanger 1154 to the steam generator 1128 via conduit 1142. The heat from the ATO exhaust stream is used to convert the water into steam via heat exchange in the steam generator 1128. The ATO exhaust stream is then removed from the system via the exhaust conduit 1124. Thus, by controlling the air inlet blower output (i.e., power or speed), the magnitude (i.e., volume, pressure, speed, etc.) of air introduced into the system may be controlled. The cathode (air) and anode (fuel) exhaust streams are used as the respective ATO air and fuel inlet streams, thus eliminating the need for a separate ATO air and fuel inlet controllers/blowers. Furthermore, since the ATO exhaust stream is used to heat the air inlet stream, the control of the rate of single air inlet stream in conduit 1122 by blower 1148 can be used to control the temperature of the stacks 1102 and the ATO 1104.

Thus, varying the main air flow in conduit 1122 using a variable speed blower 1148 and/or a control valve may be used to maintain the stack 1102 temperature and/or ATO 1104 temperature. The main air flow rate control via blower 1148 or valve acts as a main system temperature controller. Furthermore, the ATO 1104 temperature may be controlled by varying the fuel utilization (e.g., ratio of current generated by the stack(s) 1102 to fuel inlet flow provided to the stack(s) 1102). Finally the anode recycle flow in conduits 1120 and 1140 may be controlled by a variable speed anode recycle blower 1146 and/or a control valve to control the split between the anode exhaust to the ATO 1104 and anode exhaust for anode recycle into the mixer 1132 and the fuel inlet conduit 1116.

In this embodiment, there are no external fuel and air inputs to the ATO 1104. Thus, in contrast to prior art systems, external natural gas or another external fuel is not fed to the ATO 1104. Instead, the hot fuel (anode) exhaust stream from the fuel cell stack(s) 1102 is partially recycled into the ATO as the ATO fuel inlet stream. Likewise, there is no outside air input into the ATO. Instead, the hot air (cathode) exhaust stream from the fuel cell stack(s) 1102 is provided into the ATO as the ATO air inlet stream.

Furthermore, the fuel exhaust stream is split in a splitter 1134 located in the hot box 1101. The splitter 1134 is located between the fuel exhaust outlet of the anode recuperator (e.g., fuel heat exchanger) 1152 and the fuel exhaust inlet of the anode cooler 1126 (e.g., the air pre-heater heat exchanger). Thus, the fuel exhaust stream is split between the mixer 1132 and the ATO 1104 prior to entering the anode cooler 1126. This allows higher temperature fuel exhaust stream to be provided into the ATO 1104 than in the prior art because the fuel exhaust stream has not yet exchanged heat with the air inlet stream in the anode cooler 1126. For example, the fuel exhaust stream provided into the ATO 1104 from the splitter 1134 may have a temperature of above 350 C, such as 350-500 C, for example 375 to 425 C, such as 390-410 C. Furthermore, since a smaller amount of fuel exhaust is provided into the anode cooler 1126 (e.g., not 100% of the anode exhaust is provided into the anode cooler due to the splitting of the anode exhaust in splitter 1134), the heat exchange area of the anode cooler 1126 described above may be reduced.

In an embodiment, the functions of the energy storage system, energy storage system technologies, and the energy storage system technologies management system may be implemented in software, hardware, firmware, on any combination of the foregoing. In an embodiment, the hardware may include circuitry designed for implementing the specific functions of the energy storage system, energy storage system technologies, and/or the energy storage system technologies management system. In an embodiment, the hardware may include a programmable processing device configured with instructions to implement the functions of the energy storage system, energy storage system technologies, and/or the energy storage system technologies management system.

In an embodiment, various energy storage system technologies may be housed in separate cabinets. In an embodiment, each cabinet may include a fire suppression device or system. In an embodiment, space between adjacent cabinets may be filled with a material having a high thermal mass and may be inert (e.g., alumina powder) to provide thermal insulation between the cabinets. The material may also be placed between the cabinets and a structure housing the cabinets to provide thermal insulation from the structure.

The above described methods and systems can be readily used with multiple generators in parallel with a large load, while allowing tight control of frequency and voltage.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. An electrical power system comprising:
a fuel cell power generating system comprising:
fuel cells configured to generate direct current (DC); and
a direct current/alternating current (DC/AC) inverter configured to convert a portion of the generated DC power into AC power; and
an electrical load module comprising:
an alternating current (AC) power input port;
a direct current (DC) power input port configured to receive the DC power from the fuel cell power generating system;
a power distribution device electrically coupled to the AC power input port via a first connector and the DC power input port via a second connector, the power distribution device having an AC power output and a DC power output;
a first power supply device configured to receive AC power from the AC power output of the power distribution device;
a second power supply device configured to receive DC power from the DC power output of the power distribution device; and
a first electrical load component electrically coupled to the first power supply device and the second power supply device,
wherein the first power supply device and the second power supply device are configured to provide power to the first electrical load component, and
wherein a DC power feed from the fuel cell power generating system is directly connected to the DC power input port of the electrical load module without passing through an inverter or transformer, such that DC power generated by the fuel cell system is provided to the first electrical load component without being inverted or transformed,
wherein an AC power feed from the fuel cell power generating system is connected to the AC power input port of the electrical load module,
wherein the electrical load module is an information technology (IT) pod,
wherein the first electrical load component is a server of the IT pod,
wherein the IT pod further comprises:
a motor;
a fan coupled to the motor;
a switch electrically coupled with the motor, the first connector, and the second connector; and
an inverter electrically coupled between the second connector and the switch,
wherein the motor is powered using AC power provided at the AC power input port or DC power provided at the DC power input port,
wherein the motor is electrically coupled with the first connector and the second connector;
wherein the switch is configured to selectively couple the motor with the AC power provided at the AC power input port via the first connector and the DC power provided at the DC power input port via the second connector,
wherein the switch comprises a first input and a second input, and
wherein the first input of the switch is electrically coupled with the inverter and the second input of the switch is electrically coupled with the first connector.

2. The electrical load module of claim 1, wherein the feed from the fuel cell power generating system includes a positive bus, a negative bus, and a neutral bus.

3. The electrical load module of claim 2, further comprising:
a third power supply device coupled to the DC power output of the power distribution device; and
a third electrical load component coupled to the first power supply device and the third power supply device,
wherein the second power supply device receives power provided over the positive bus, and
wherein the third power supply device receives power provided over the negative bus.

4. The electrical load module of claim 1, further comprising:
a sectionalizer breaker of the power distribution device, the sectionalizer breaker being coupled in parallel to the first power supply device and the second power supply device, wherein the sectionalizer breaker is configured to operate in a normal operation mode, a maintenance mode, a load balancing mode, or a load prioritization mode.

\* \* \* \* \*